US012673260B2

(12) United States Patent
Wannerberg et al.

(10) Patent No.: US 12,673,260 B2
(45) Date of Patent: Jul. 7, 2026

(54) SYSTEMS AND METHODS FOR BUILDING DIGITAL ENVIRONMENTS

(71) Applicant: Adeia Guides Inc., San Jose, CA (US)

(72) Inventors: Petter Wannerberg, Lidingö (SE);
Mathew Adams, Matthews, NC (US)

(73) Assignee: Adeia Guides Inc., San Jose, CA (US)

( * ) Notice: Subject to any disclaimer, the term of this patent is extended or adjusted under 35 U.S.C. 154(b) by 291 days.

(21) Appl. No.: 18/617,184

(22) Filed: Mar. 26, 2024

(65) Prior Publication Data

US 2025/0303285 A1 Oct. 2, 2025

(51) Int. Cl.
| | |
|---|---|
| *A63F 13/52* | (2014.01) |
| *G06T 7/50* | (2017.01) |
| *G06T 7/70* | (2017.01) |
| *G06T 11/00* | (2006.01) |
| *G06T 19/20* | (2011.01) |

(52) U.S. Cl.
CPC ............... *A63F 13/52* (2014.09); *G06T 7/50* (2017.01); *G06T 7/70* (2017.01); *G06T 11/00* (2013.01); *G06T 19/20* (2013.01); *G06T 2200/24* (2013.01); *G06T 2219/2004* (2013.01)

(58) Field of Classification Search
CPC . A63F 13/52; A63F 13/63; G06T 7/50; G06T 7/70; G06T 11/00; G06T 19/20; G06T 2200/24; G06T 2219/2004; G06T 2210/61; G06T 17/00; G06F 40/00
USPC .......................................... 463/31
See application file for complete search history.

(56) References Cited

U.S. PATENT DOCUMENTS

| | | | | |
|---|---|---|---|---|
| 6,912,293 | B1 * | 6/2005 | Korobkin ................ | G06T 15/20 |
| | | | | 382/284 |
| 12,211,151 | B1 * | 1/2025 | Chiou .................... | G06T 19/003 |
| 2011/0025690 | A1 * | 2/2011 | Tzur ........................ | G06T 15/10 |
| | | | | 345/584 |
| 2019/0066361 | A1 * | 2/2019 | Murray ................ | G01C 11/025 |
| 2020/0139248 | A1 * | 5/2020 | Sefcik ..................... | A63F 13/60 |
| 2024/0169665 | A1 * | 5/2024 | Klingbeil .................. | G06T 1/60 |
| 2024/0249443 | A1 * | 7/2024 | Maschmeyer .......... | G06T 11/00 |
| 2024/0296643 | A1 * | 9/2024 | Woodard, Jr. .......... | G06T 19/20 |
| 2025/0252661 | A1 | 8/2025 | Wannerberg et al. | |

OTHER PUBLICATIONS

Adobe Firefly, "The new Firefly. Now smarter than ever," available online at: <https://www.adobe.com/products/firefly.html>, retrieved on May 23, 2024, 11 pages.
Adobe Photoshop, "Next generation Generative filing. Now in Photoshop," available online at : <https://www.adobe.com/se/products/photoshop/generative-fill.html?gclid=CjwKCAiAg9urBhB_EiwAgw88mYAh5wReC_gt1aHV-IdybOUSsCnPeMc6flWQo_o_yg8hbtSc5bfx3RoCfTIQAvD_BwE&mv=search&mv=search&mv2=paidsearch&sdid=FMHMZ65L&ef_id=CjwKCAiAg9urBhB_EiwAgw88mYAh5wReC_gt1aHV-IdybOUSsCnPeMc6flWQo_o_yg8hbtSc5bfx3RoCfTIQAvD_BWE:G:s&s_kwcid=AL!3085!3!666929782537!e!!g!!.

(Continued)

*Primary Examiner* — Michael A Cuff
(74) *Attorney, Agent, or Firm* — HG LAW LLP

(57) ABSTRACT

The creative process to generate 3D content is made significantly smoother through quick iteration between 2D artwork and 3D objects. Generative AI is leveraged to create both 2D artwork and corresponding 3D objects. Placement of 3D objects within a 3D environment is based on the positions of each object in a 2D editing frame. Modifications may be made to objects in either the 2D editing frame or in the 3D environment, and each is updated in response to such modifications.

20 Claims, 13 Drawing Sheets

(56) References Cited

OTHER PUBLICATIONS

Autodesk, "Photogrammetry software," available online at: <https://www.autodesk.com/solutions/photogrammetry-software>, retrieved on May 23, 2024, 11 pages.

CLIP: Connecting text and images, available online at: <https://openai.com/index/clip/>, Jan. 5, 2021, 15 pages.

DALL•E 2 is an AI system that can create realistic images and art from a description in natural language, available online at: <https://openai.com/index/dall-e-2/>, retrieved on May 23, 2024, 8 pages.

Gao, J., et al., "GET3D: A Generative Model of High Quality 3D Textured Shapes Learned from Images," Toronto AI Lab, available online at: <https://research.nvidia.com/labs/toronto-ai/GET3D/>, retrieved May 23, 2022, 8 pages.

Git hub, "Let's build from here The world's leading AI-powered developer platform," available online at: <https://github. com/>, retrieved on May 23, 2024, 12 pages.

Leonardo ai, "Unleash your Creativity with the power of Leonardo Ai," available online at: <https://leonardo.ai/>, May 23, 2024, 6 pages.

MasterpieceX.com, "Prompt. Generate. Prototype," available online at: <https://www.masterpiecex.com/>, retrieved on May 23, 2024, 8 pages.

Miangoleh, S. M. H., et al., "Boosting Monocular Depth Estimation Models to High-Resolution via Content-Adaptive Multi-Resolution Merging," Proceedings of the IEEE/CVF Conference on Computer Vision and Pattern Recognition (CVPR), 2021, pp. 9685-9694.

Midjourney, available online at: <https://www.midjourney.com/home>, May 23, 2024, 4 pages.

Perforce, "Solve the Hardest DevOps Challenges With the Power of Perforce, Maintain your competitive edge with solutions powered by Perforce," available online at: <https://www.perforce.com/>, May 23, 2024, 8 pages.

Segment Anything, Segment Anything Model (SAM): a new AI model from Meta AI that can "cut out" any object, in any image, with a single click, AI Computer Vision Research, available online at : <https://segment-anything.com/>, retrieved on May 23, 2024, 6 pages.

Stable Diffusion Online, available online at: <https://stablediffusionweb.com/>, retrieved on May 23, 2024, 8 pages.

Stephens, J., "Getting Started with NVIDIA Instant NeRFs, Computer Vision / Video Analytics," available online at: <https://developer.nvidia.com/blog/getting-started-with-nvidia-instant-nerfs/>, May 12, 2022, 6 pages.

U.S. Appl. No. 18/430,312, filed Feb. 1, 2024, title: Systems and Methods for Providing Semantics-Based Recommendations for Three-Dimensional Content Creation.

Unity 3D, Go Create, Unity Real-Time Development Platform | 3D, 2D, VR & AR Engine, available online at: <https://unity.com/>, retrieved on May 23, 2024, 10 pages.

Unity's version control system Powered by Plastic SCM, available online at: <https://unity.com/solutions/version-control>, retrieved on May 23, 2024, 19 pages.

Unreal Engine, We make the engine. You make it Unreal, The most powerful real-time 3D creation tool—Unreal Engine available online at: <https://www.unrealengine.com/en-US>, retrieved on May 23, 2024, 12 pages.

Whisper, Introducing APIs for GPT-3.5 Turbo and Whisper, available online at: <https://openai.com/index/introducing-chatgpt-and-whisper-apis/>, Apr. 24, 2024, 9 pages.

* cited by examiner

400

Put a bench on the left, a potted plant to the right of the bench, and a lamp post behind the right side of the bench

402

```
404    Object1 {
               assetID: 14f0c3b8a922017b    406
               type: structure    408
               x: 100
               y: 500    410
               width: 300
               height: 125    412
               description: "bench"    414
               input: "Put a bench on the left"    416
               depth: 0    418
       }
420    Object2 {
               assetURL: http://abcd.efg/assets/1a587b6ce3f6    422
               type: flora
               x: 300
               y: 450
               width: 75
               height: 125
               description: "potted plant"
               input: "a potted plant to the right side of the bench"
               depth: 0    424
       }
426    Object3 {
               assetID: a90375b0d0e273be
               type: lighting
               x: 275
               y: 25
               width: 50
               height: 400
               description: "a Victorian-style lamp post made of black
                             metal, with modern electric light and 2
                 428    banners attached to the upper half of the
                             lamp post"
               input: "a lamp post behind the right side of the bench"
               depth: 1    430
       }
```

SYSTEMS AND METHODS FOR BUILDING DIGITAL ENVIRONMENTS

BACKGROUND

This disclosure relates to building computer-generated or digital environments, such as 3D virtual worlds that include virtual reality (VR) and/or augmented reality (AR) content.

SUMMARY

Developers and content creators have access to technology to build digital or virtual environments. For instance, software frameworks, such as game engines (e.g., Unreal Engine and Unity 3D), offer powerful tools for building 3D environments. However, the intricate nature of three dimensional (3D) game design, coupled with the common workflow including extensive collaboration and rigorous testing, often leads to lengthy development timelines in the pursuit of creating immersive and engaging gaming experiences. Unreal Engine and Unity currently have integrated VR support, allowing users to access and modify projects while immersed in a VR space. This integration helps to provide a more immersive workflow, allowing world builders to make real-time adjustments to their environments directly from within the VR space. VR controllers, with their six degrees of freedom, help world builders to sculpt and position objects naturally, transcending the limitations of traditional two dimensional (2D) interfaces. VR offers a sense of scale and depth that allows world builders to traverse through their creations, gaining an authentic sense of the space they are crafting. The game engines are able to allow full access to their systems while the user is in VR whereas most interfaces are not strictly designed for VR interaction. However, before a world can be built in 3D at all, a design team may need to agree upon the vision of what to build.

Generally, game studios assign junior and senior roles for game design and level design. When a junior role, such as a concept artist, sketches a scene, it may be checked and authorized by a more senior role, such as a lead designer or an art director. As used herein, "design lead" may refer to the senior employee who reviews the art or the progress of a scene or level, and approves or redirects its development.

The journey from an idea to a fully realized 3D game is time-consuming because it involves a meticulous exploration of the game's aesthetics through numerous iterations. This often involves a collaborative effort between 3D artists, 3D teams, and the lead designer, all working to perfect the visual and artistic aspects of the game. A team of concept artists generally works to define the concept and visual look and feel of the game. These concept artists usually do not work in a 3D environment, but rather use 2D interfaces to create evocative images that inspire and guide the overall development of the game. Concept art for projects, such as video games, is commonly created in 2D to quickly get a feel for the mood, lighting, and sets that the team wants to build.

Once the aesthetic direction is established, the 3D asset creation pipeline becomes the main focus. Due to the high cost of creating high quality 3D assets or content, this part of the process should be well-defined to make efficient use of the time spent on each 3D asset. A streamlined 3D content editing cycle ensures that assets are created, refined, and integrated into the game with precision, and contributes to the overall efficiency of the game development process while also delivering on the visual promise of the concept artists.

Moving from 2D concept art to 3D digital asset and environment creation is not easy. One significant challenge in game development occurs when concept art, initially conceived outside the game engine, is not directly visible or interactive within the engine itself. This separation between the 2D concept art and the 3D game engine can lead to several complications, with 3D artists often needing to reimagine the space as a 3D scene. This process may unfold in multiple stages. First, concept art typically provides a static, 2D representation of an object or environment, and lacks the spatial context, scale, and depth perception that are integral to a 3D environment. This limitation makes it challenging for 3D artists to fully grasp how the elements in the concept art will function within the dynamic and immersive 3D world represented by the game engine. Next, interactivity and gameplay are considered. A critical aspect of game design is how the player interacts with the environment and the game's assets. Concept art often does not address these interactivity and gameplay considerations, leaving 3D artists to make assumptions or interpret how the 2D design should translate into a functional 3D space. Third is artistic interpretation. The transition from 2D concept art to a 3D environment necessitates artistic interpretation. 3D artists must envision how to transform the 2D visuals into a 3D scene in a way that aligns with both the aesthetic intent and the practical requirements of the game engine. This interpretation can introduce variations and reimaginations of the original concept. Finally, communication challenges among the designers are addressed. Effective communication between concept artists and 3D artists is important. Misunderstandings or discrepancies in conveying the artistic vision and technical specifications can lead to deviations from the initial concept art. Bridging these communication gaps is essential to maintaining consistency in the game's visual design.

Generative AI systems are another useful tool to generate content, particularly in the form of images, based on natural language input. A human speaks or writes what they want to see, and the generative model creates images based on this input. The continued development of generative AI is likely to speed up (and in some cases may replace) the work of 2D concept artists in game design studios. When ideas can become concept art as easily as speaking, the iterative cycle of finding the look for a specific style or scene of the game is greatly accelerated.

Large language models (LLMs) are also rapidly becoming the interface to other advanced software. OpenAI's ChatGPT, and the attached transcription service Whisper, now has built-in image recognition as an added feature. This allows ChatGPT and many other emerging LLMs the ability to take in not only text and voice, but also images as instructions for new images or texts to be generated. The LLM itself can also, for example, be fed an extremely detailed description about another image generation software, including the most useful prompts to achieve a specific look. This allows the user to speak in very simple terms to then let the LLM generate a much more nuanced descriptor of what the user wants to see based on context, previous conversations or style of art that has been shown to the AI beforehand.

Components of an image may sometimes need to be analyzed. This is something that AI models such as Segment Anything and OpenAI's CLIP can do. For example, pixels of an image can be taken as input to determine what objects can be found in the image with a high degree of certainty. The same technology is used in automotive solutions to identify, for example, traffic lights, other cars, and pedestrians in any given video frame. 2D images and art may need to be divided up into distinct and precise pieces. These systems will not only identify discrete parts of an image (e.g., trashcan, tree, dog) but will also be able to highlight, cut out or move the identified object with high accuracy.

AI is transforming the realm not only of 2D art but of 3D art as well. While still not perfect, existing AI 3D generation tools are bound to enter the game design industry in full force since the creation of 3D content is one of the costliest parts of game creation. These generated 3D models do not yet have the flexibility, procedural material workflows, or high fidelity we have come to expect from most games today, so it is likely that a 3D artist will still need to create, or refine, the final 3D model that goes into the game. But even though the results are sometimes rough and prone to error, these AI-generated 3D models can be used as reference for an artist to understand what to build, or simply as a reference object for ideation, quickly generated, quickly substituted once a new look, feel or concept is developed.

The transformation from 2D to 3D can also be aided by AI depth mapping. A 2D pixel input, such as a photo or AI-generated image, can have accurate and high-resolution depth maps applied to it using monocular depth estimation. This method is able to accurately determine depth queues in both close-up detailed objects and larger objects such as landscapes and produces robust estimation results even in artworks of varying styles.

Computer-generated content, be it for 2D or 3D art, does not have to be perfect to facilitate a game designer's ideation process. It only needs to speed up the process within which people understand each other and align on what should and should not be built in the 3D world they are trying to create.

A game design lead will want to be sure that the 3D art team is working on the right assets for any given scene, which is difficult to do before the scene can be rendered in 3D. Once a 3D design is approved, there is still much work to do to set up the 3D assets in a workflow for the 3D artists to start working with each individual asset. A task management system is needed to keep track of everyone's work and make sure the right 3D job goes to the right 3D artist. This work process could be automated in a system that could understand a 2D or 3D scene and could break down the tasks for each 3D artist.

In one example, an artist enters a game engine in VR and holds up their hands to indicate where and how they want to generate a 2D image. The artists may speak a prompt for a generative AI system to create an object and then see the object emerge before them. After any adjustments by the user, the 2D image is segmented into distinct objects and projected into the scene. The result is a 3D scene with a number of 2D sprites positioned in 3D space. Each segmented 2D object may include metadata such as a description what it is, the prompt that created it and in what context it was generated. A design lead could put on a VR headset and step into the imagined world in 3D, even in the concept art stage.

What is desired is a way to shorten the costly cycles of game design by leveraging generative AI inside the game engine through a sophisticated iterative world creation system. A system that allows a 3D scene to be rendered quickly from a 2D interface, and allows users to modify the 3D scene through a simple and intuitive 2D interface would enable such an iterative design process.

Utilizing the techniques disclosed herein, users would not have to master and jump between different creative tools. In contrast, with this solution, the process becomes fast, iterative, flexible, tracked, and logged for 3D production. This results in rapid flexibility and allows creativity and testing of many different ideas, directly in VR, without having to go through the traditional 3D pipeline to see them.

The systems described herein can interface with a game engine to create concept art that can be visualized and rendered in 3D without having to manually create and place all sprites and assets. Features of the system include, for example: (a) creating and saving metadata for the art needed for transitioning into the 3D scene as well as the generative 3D art creation in later steps; (b) placing 2D sprites in a 3D scene so that their placement and data can be used for further generative steps; (c) binding the 2D art to the 3D objects in the scene and using metadata to update, reposition, edit, and delete objects in the 3D scene; and (d) using pixel density input from the original 2D art to perform correct scale projection in the 3D world as well as perspective from the user.

3D assets can be updated in a 3D scene using a 2D interface (referred to below as the "art frame" or "editing frame") while also allowing the 3D data already placed in the 3D scene to affect the 2D art as well. Using the disclosed techniques, the 2D and 3D art can be enhanced and edited rapidly together with the cyclical relationship between 2D art and 3D assets.

Systems and methods are described herein for building a virtual or digital 3D environment. An art frame (e.g., a 2D editing interface) is generated and a first input is received indicating at least one object to be added to the art frame. The input may be a text input, a voice input, or an image input. AI and/or LLM tools may be used to process the input and generate an appropriate 2D sprite in the art frame for each object indicated in the input. The input can identify a specific object, a type of object, a location at which the object should be placed, and/or a depth at which the object should be placed. The depth may be specified in terms relative to other objects already in the art frame, or to other objects indicated in the input. For example, the user may say "put a bench in the foreground on the left, a potted plant to the right of the bench, and a lamppost behind both of those." 2D sprites of a bench, a potted plant, and a lamppost may then be generated and placed in the art frame at the indicated positions and depths.

A 3D scene including representations of each 2D sprite is then generated for display. In some implementations, a separate input may be received for each 2D sprite to be placed in the 3D environment. For example, after placing several sprites in the 2D editing frame, the user may decide that some objects are ready to be added to the 3D environment while some objects need further refinement or should not be included at all. The user may, at any point, select objects to be added to the 3D environment, without committing all 2D sprites to the 3D environment.

The display may be an extended reality (XR) display. As used herein, XR may refer to VR, AR, or any other virtual or mixed reality display. A further input to modify the 3D scene is received and, in response, a second art frame (or a modified version of the first art frame) is generated for display within the XR display. The second art frame includes 2D sprites corresponding to the 3D assets in the scene and their positions relative to a current view of the user within the 3D scene. An input modifying a 2D sprite is received, and the 2D sprite and corresponding 3D asset are both updated.

In some embodiments, a segmentation engine is used to analyze the 2D art frame and identify the different objects it contains. A relative depth of each object is then determined based on analysis performed by the segmentation engine. For example, if a first object partially overlays a second object, the second object may be "deeper" within the art frame relative to the first object. Based on the depth information and 2D positioning information within the art frame, 3D position information is calculated for each object.

In some implementations, an object type of each object is determined. Objects of a first object type are assigned to first layer, while objects of a second object type are assigned to a second layer. An input may be received to edit objects of a given object type. In some embodiments, a user may manually assign objects to different layers. Objects may also be grouped into layers based on other factors such as spatial location, size, color, and/or degree of interactivity. In response to the input, a 2D art frame may be generated for display that includes only objects in the corresponding layer. Relative size, position (including depth), and orientation of each object are preserved in the 2D art frame, and the corresponding 2D objects are placed in the 2D art frame accordingly. In some cases, the orientation of a 3D object may have been changed after its initial placement into the 3D environment. The orientation of the 3D object when initially placed into the 3D environment may have been based on the view of the corresponding 2D object in an initial 2D art frame and a 2D object showing a view corresponding the current orientation of the 3D object may not be available for placement into the 2D art frame. Accordingly, in some embodiments, the current orientation of the 3D object may be processed to generate a corresponding 2D image for placement in the 2D art frame in order to accurately represent, within the 2D art frame, the 3D object in its current orientation. In other embodiments, the original 2D art corresponding to the 3D object is retrieved and placed in the 2D art frame. The original 2D art may be stretched, skewed, rotated, or otherwise transformed to match the current orientation of the 3D object as closely as possible.

Objects placed in the 3D environment may be edited in the 3D environment or in the 2D art frame to effect changes in each context. An input to modify an object in the 3D environment may trigger display of the art frame. Alternatively, an additional input may be used to toggle display of the art frame. Selection of an object to be modified may trigger display of metadata associated with the selected object. The metadata may be displayed in the 3D environment as an overlay or in the 2D art frame. The context in which the metadata is displayed may depend on the context in which the input to modify an object was received. If the input was received in the 2D editing frame, the metadata may be displayed in the 2D editing frame. If the input was received in the 3D environment, the metadata may be displayed in the 3D environment. The metadata displayed may be a subset of the metadata associated with the selected object. For example, the metadata may include an asset identifier corresponding to the object or to artwork used to render the object, position Information, size information, object type, a description of the object, and a copy, transcription, or other indication of the input from which the object was added to the art frame and/or 3D environment. the metadata displayed to the user may include only some of this information, such as position information or a natural language component of the input from which the object was added. When an object is modified in either the 2D editing frame or the 3D environment, both the 2D editing frame and the 3D environment are updated substantially simultaneously.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and each of illustration, these drawings are not necessarily made to scale.

FIG. 4 shows an illustrative example of metadata generated for a plurality of objects indicated in a user input, in accordance with some embodiments of the disclosure;

DETAILED DESCRIPTION

Figure 1:
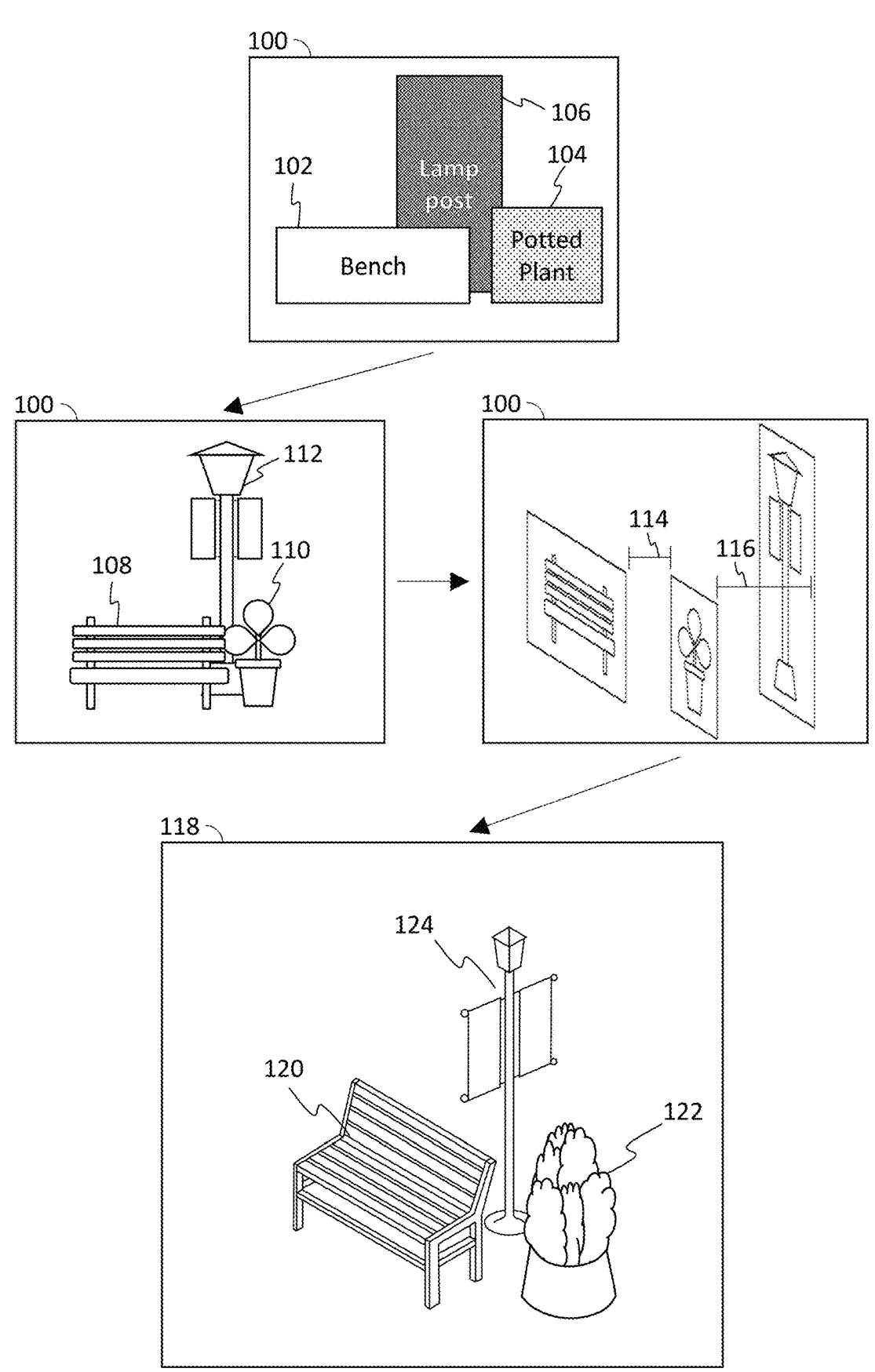
FIG. 1 shows an illustrative example of generating a 3D environment, in accordance with some embodiments of the disclosure.

By binding 2D art and corresponding 3D art together in a responsive and editable relationship, the art frame and its surrounding architecture (as described further below) become powerful tools for editing 2D art and 3D art, and also updating one environment with the changes made in the other. If something is updated in the 2D art frame it is reflected in the 3D scene, and if something is updated in the 3D scene it is updated in the 2D art frame. This is done by saving and updating positional data in a database or other data structure that is updated as the 2D art in the art frame is edited.

In an embodiment, concept art is edited in the art frame. The art frame may be presented as a graphical user interface in the 3D environment, such as a frame held by the user in a VR environment. The user can wield this frame in the 3D environment much like a tablet in the real world. The frame is the interface of the 2D art in the 3D world. It could be handheld and directed towards a specific direction; alternatively, it could surround the player like a screen. This 2D interface in the 3D world allows the user to interact with the 2D art and the AI interface using voice and text input, for instance, to generate and edit the 2D art or content without having to leave the VR environment.

In an embodiment, 2D segments are generated using a segmentation engine, such as Segment Anything. Generally, segmentation engines allow for the artwork to be completed and arranged inside the frame, and also allow each segment (e.g., distinct object) to be placed on its own layer within the frame within the compiled 2D image, where each layer is at a different depth. This makes it possible to interact with each segment individually and/or project them into the 3D scene as their own sprites. A first 2D segment in the art frame is projected into the 3D scene. In the 3D scene, the segment may be represented as a sprite with a transparent background and/or as a wire mesh sprite that is able to form itself as a 3D object around the edges of the 2D image content. Another 2D segment in the art frame may then be projected into the 3D scene, and placed behind or in front of the first segment based on its depth relative to the first 2D segment.

The user may edit the scene using the 2D art frame. The 2D art frame may be rendered based on a current perspective from which the user is viewing the 3D scene. As the user edits objects in the 2D art frame, the 3D scene is modified to reflect the changes. The user may also edit the scene using tools available in the 3D rendering engine. 3D art may be scaled and moved around by manipulating the 3D representations of each object. As the user edits the 3D scene, the 2D art frame may be updated to reflect the changes. The 2D art frame and 3D scene exchange 3D objects and 2D objects. For example, positional data for each 2D object may be saved as it is processed by a segmentation engine or placed or moved within the 2D editing frame or the 3D environment. These positions are exchanged between the 2D editing frame and the 3D environment, such that when an object is moved or resized in, for example, the 3D environment, the corresponding sprite in the 2D editing frame reflects the change. Similarly, if the position or size of a sprite is changed in the 2D editing frame, the corresponding 3D object in the 3D environment will reflect that change as well. If the art frame is placed inside the 3D rendering engine and holds art that can be segmented, the segments can be projected into the 3D scene where 3D objects and 2D art can mix. This new 3D data can be viewed through a virtual camera that can allow the reinterpretation of the 3D art and the 2D art together and compile it into a new 2D image. Additional edits can be made where the 2D data and 3D data feed into each other in the refinement of the 3D scene.

FIG. 1 shows an illustrative example of generating a 3D environment, in accordance with some embodiments of the disclosure. 2D editing frame 100 (e.g., the art frame) is generated for display to the user. 2D editing frame 100 may be displayed on a traditional 2D display (e.g., a computer, tablet, or mobile device), or may be displayed as an interactive component (e.g., an object that the user can pick up, move, or otherwise manipulate) inside an XR display. In some embodiments, the 2D editing frame is a projected cylindrical surface or dome that surrounds the user in a 3D environment. 2D art may be adapted to a 360° format. For example, 2D sprites may be displayed along the projected cylindrical surface. If the size of the cylinder or dome is expanded to fill the space around the user (e.g., the maximum size permitted by a guardian boundary set by the XR display), it can allow the user to interact using hand gestures and/or XR device controllers to edit the 2D content. 2D editing frame 100 holds the 2D art and guides the position of objects within the 3D scene, and also allows for a traditional 2D editing interface for the 3D environment. Based on input from the user, several objects may be added to 2D editing frame 100. For example, the input may be natural language text that is either input by the user using a physical or virtual keyboard or transcribed from a voice input. The input may also be a selection, by the user, of a predefined or prerendered object from a 2D asset catalog. Selection of an asset from the catalog may result in retrieval of the 2D asset as well associated descriptive metadata. The input may further include where on the 2D editing frame a selected or described object should be placed. Such placement information may be relative to other objects in the 2D editing frame, or relative to the 2D editing frame itself. A single input may include, describe, select, or otherwise indicate any number of objects.

One or more inputs may be received from the user indicating that bench 102, potted plant 104, and lamppost 106 should be placed in the 2D editing frame. Placeholders for the objects, such as colored or shaded bounding boxes, may initially be added to and positioned in the 2D editing frame. A description of each object is extracted from the input. The extracted description may be a text description of the object transmitted to a generative AI model, which returns 2D image assets representing each object. In some cases, the extracted description may first be transmitted to an LLM to generate a more detailed description of the desired object, which is then transmitted to the generative AI model. Returned 2D image assets 108, 110, and 112 are then placed in 2D editing frame 100 based on positional information included in the input. For example, the input may include relative positional statements, such as "to the right of" or "behind" or any combination of these or similar positional statement. An illustrative input may say "put a bench on the left, with a potted plant to the right of the bench and a lamppost behind the bench." Based on this input, a bench may first be placed on the left side of the 2D editing frame. A potted plant and lamppost may then be placed in positions within the 2D editing frame relative to the position of the bench an accordance with the positional statements contained in the input. If the user subsequently moves one of the objects such that it is no longer positioned at a locations that satisfies the positional statements given in the input, a prompt may be generated for display to the user to confirm whether other objects whose positions are set relative to the moved object should also be moved, or if the user intends to change or disregard the previously input relative positions.

Depending on how the 2D editing frame was populated, the relative depth of each object may need to be determined. For example, if the 2D editing frame was populated using a generative AI model, or if the user manually placed individual objects at certain depths, then some depth information may already be available for each object. However, if the 2D editing frame was populated by capture or scanning of a 2D image, further processing may be required to identify the depth of each object in the image. The artwork contained in 2D editing frame 100 is then processed using a segmentation engine to determine the relative depths of each object. The segmentation engine splits the 2D artwork into individual 2D objects. The individual 2D objects may be arrayed in order of increasing depth. Differences 114, 116 in the depth of each object are then calculated. For example, the closest object to the viewport of the 2D editing frame (e.g., a foreground object) may be identified and its depth used as an origin point from which the depth of each object can be measured. Thus, difference 114 may be calculated as the depth of potted plant 110 minus the depth of bench 108.

After segmentation is complete and the depth of each 2D object has been determined, the 2D objects are projected into a 3D scene 118. Each 2D object is committed to a corresponding 3D sprite. The 2D image asset is appropriately scaled and placed within the 3D scene based on, for example, monocular depth estimation. This allows each 3D sprite to become the appropriate size and to be placed at the intended distance for the 3D sprite (object representation) to align with its depth relative to the other segments (i.e., objects identified by the segmentation engine) in the 2D editing frame. The description used to generate the 2D image asset for a respective object (e.g., a text prompt input into a generative AI model) may be stored in association with the 3D sprite or the 2D object. Each segment of the 2D editing frame now has a 3D position and has metadata associated with it. The metadata may include the 2D image asset and the description of the object (an original description input by the user, an LLM-generated description, or both). This information can be fed into a 3D generative engine (e.g., an AI image generator such as DALL-E, Midjourney, etc.) that interprets the information and creates a 3D model based on the interpretation. 3D scene 118 may comprise the 3D model, which includes 3D assets 120, 122, and 124 corresponding to 2D assets 108, 110, and 12, respectively. Alternatively, each segment may be interpreted as a 3D asset before it is projected into the 3D scene. An alternate 3D asset may be regenerated by the user for any object if the desired look of the object is not initially achieved. A 3D artist may also be tasked with generating an appropriate 3D object.

Figure 2:
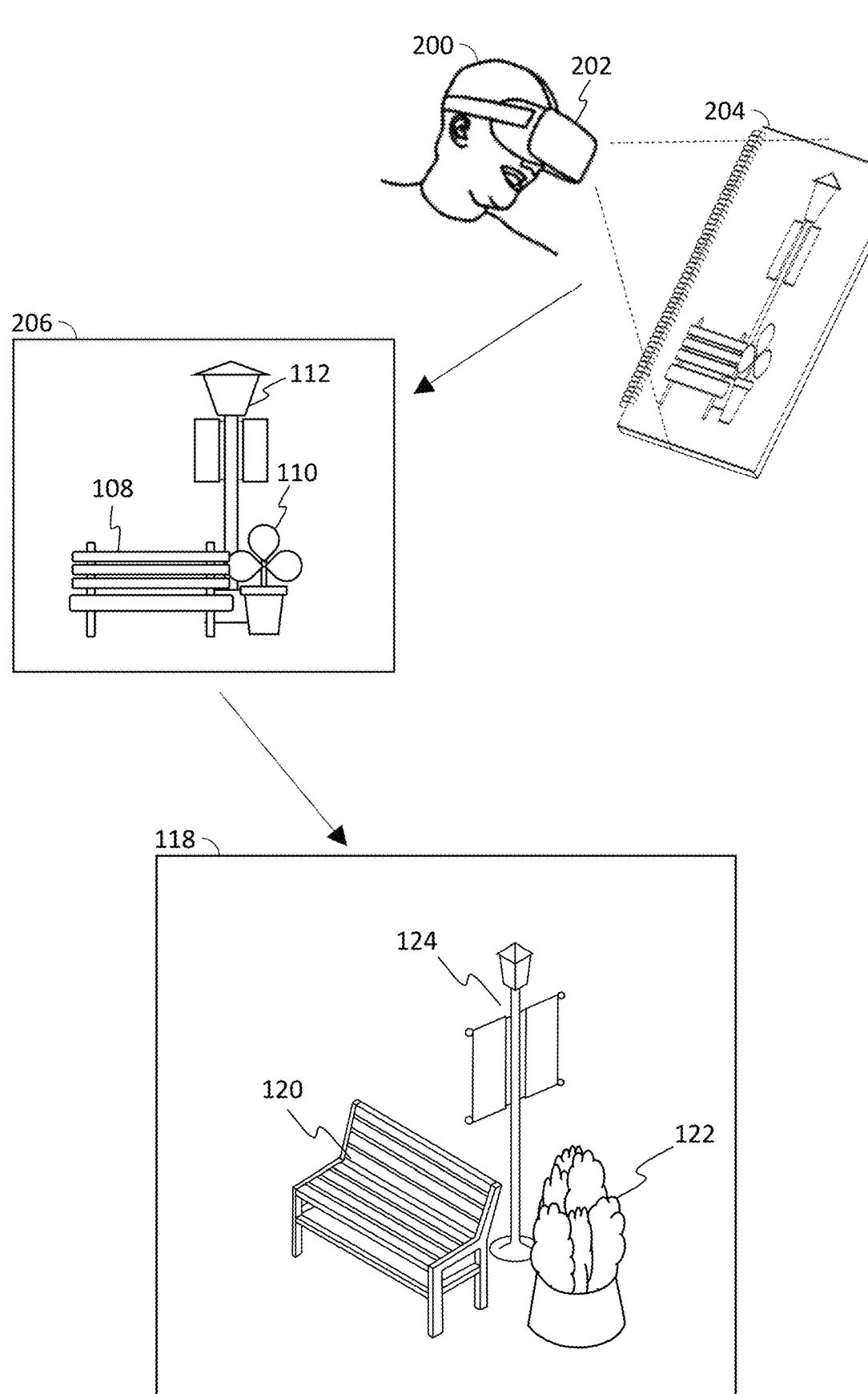
FIG. 2 shows an illustrative example of generating a 3D environment based on an image captured by an XR device, in accordance with some embodiments of the disclosure.

FIG. 2 shows an illustrative example of generating a 3D environment from a 2D "art frame" based on an image captured by an XR device, in accordance with some embodiments of the disclosure. User 200 may be wearing XR device 202. User 202 may view a physical drawing 204 representing the 3D environment to be generated. For example, a designer may sketch a number of objects on paper. In another example, physical drawing 204 may be printed in a publication, such as a book or magazine. XR device 202 captures an image of physical drawing 204. XR device 202 may perform segmentation on the captured image to identify the individual objects represented in physical image 204. 2D representations 108, 110, 112 of each object are imported into 2D editing frame 206. XR device 202 may also perform depth mapping to identify the depth of each object relative to each other object, as described above in connection with FIG. 1. From 2D editing frame 206, XR device 202 projects the 2D objects are into a 3D scene 118, as described above in connection with FIG. 1.

Figure 3:
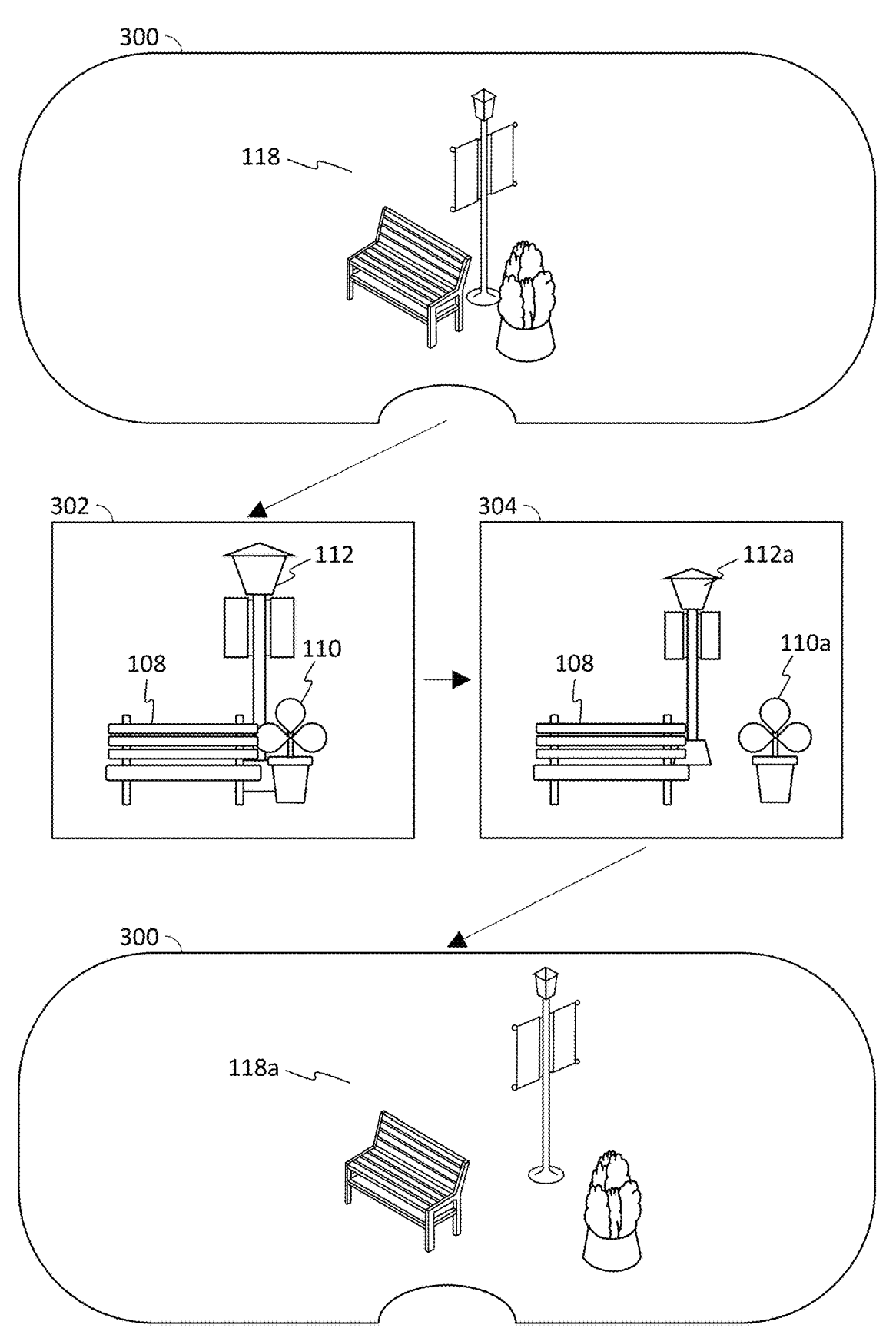
FIG. 3 shows an illustrative example of modifying a 3D environment, in accordance with some embodiments of the disclosure.

FIG. 3 shows an illustrative example of modifying a 3D environment, in accordance with some embodiments of the disclosure. Continuing the example of FIGS. 1-2, 3D scene 118 may be displayed on XR display 300. An input from the user may cause 2D editing frame 302 to be displayed, through which the user may edit the objects in the 3D scene. In some embodiments, the 2D editing frame 302 is newly regenerated based on a current view of the 3D scene to place the 2D objects at positions within the 2D editing frame corresponding to the user's current perspective of those objects within the 3D scene 118. User inputs may be received to modify a position, scale, or any other attribute of one or more objects in the 2D editing frame 302. For example, lamppost 112 may be edited to be deeper within the 2D editing frame 304, which may be represented by scaling lamppost 112 to a smaller size and raising its position (shown as lamppost 112a in 2D editing frame 304). Potted plant 110 may also be edited (shown as potted plant 110a in 2D editing frame 304). When the user has completed their edits, or concurrent with each individual modification, the 3D scene is updated to reflect the modifications made within the 2D editing frame (shown as 3D scene 118a).

FIG. 4 shows an illustrative example of metadata generated for a plurality of objects indicated by user input, in accordance with some embodiments of the disclosure. A natural language input 400 may be received from a user to add at least one object to either the 2D editing frame or the 3D environment. Continuing the example of FIGS. 1-3, the natural language input may be "Put a bench on the left, a potted plant to the right of the bench, and a lamppost behind the right side of the bench." The natural language input may be received using any suitable data connection over which voice or text inputs may be transmitted. In the case of voice inputs, the natural language input may be received using a microphone. The natural language input may be a text input or a voice input, for example. Based on this input, metadata 402 may be generated. A respective set of metadata may be generated for each object indicated by input 400. Metadata set 404 may be generated for a first object, designated as Object1. The metadata set may include an assetID 406. In the example of FIG. 4, assetID 406 is a 16-bit hexadecimal number, and may correspond to the object or to the 2D image of the object. The metadata set may also include an object type 408, 2D position information such as x,y coordinates 410, size information such as width and height parameters 412, a description of the object 414, a text portion 416 of input 400 from which the object was generated, and a relative depth 418. Description 414 may be a noun extracted from portion 416. Relative depth 418 may be an integer value, with lower number being closer and higher numbers begin farther away. In the example of FIG. 4, no depth information for Object1 was included in input 400. Accordingly, the relative depth is set to 0 as the closest possible object. If and additional object is added with relative depth information indicating that it should be placed in front of Object1, depth value 418 may be increased and the new object assigned a depth value of 0. If other objects were assigned higher depth values based on an indication in an input that they should be behind Object1, their depth values will also be increased.

Metadata set 420 for a second object, designated as Object2, may include similar fields as metadata set 404. In the cases where the assetID refers to the image corresponding to the object, metadata set 418 may include assetURL 420 in place of an asset ID. The assetURL 420 may be a link to a stored image or other asset representing the object. Since input 400 also does not include any relative depth information for Object2, its depth value is also set to 0. Metadata set 426 for a third object, designated as Object3, may also include similar fields as metadata sets 404 and 420. However, in the case of Object3, a portion of input 400 may have been fed into an LLM to generate a more detailed description of the object. Description 424 may thus comprise the LLM response instead of simply a noun extracted from input 400. Additionally, input 400 includes relative depth information indicating that Object3 should be behind Object1. Accordingly, depth value 430 is set to 1.

Figure 5:
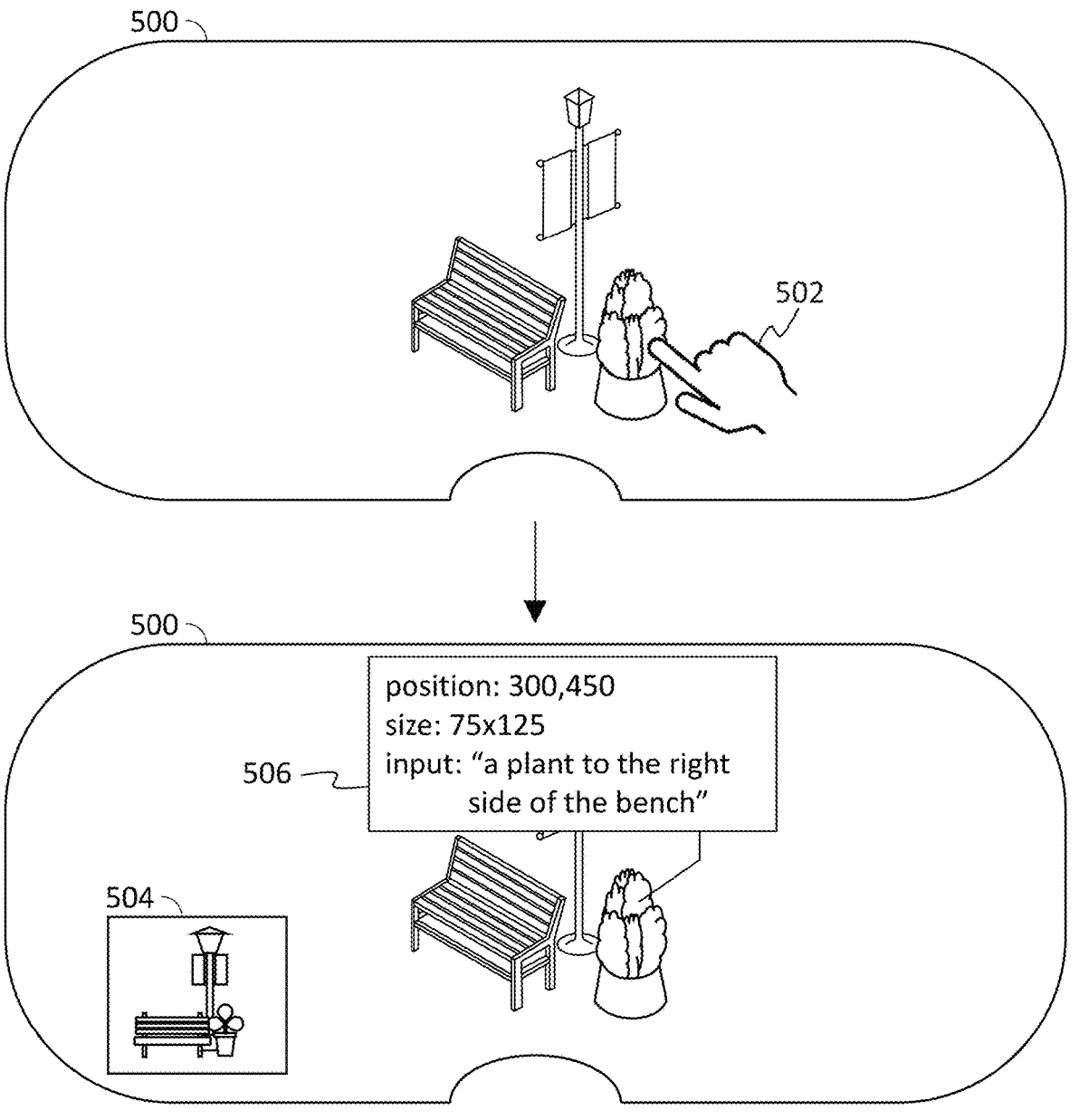
FIG. 5 shows an illustrative example of a user interface displayed in response to an input to modify an object in a 3D environment, in accordance with some embodiments of the disclosure.

FIG. 5 shows an illustrative example of a user interface displayed in response to an input to modify an object in a 3D environment, in accordance with some embodiments of the disclosure. A 3D scene may be displayed on XR display 500. A user input 502 may be received indicating that an object within the 3D scene is to be modified. User input 502 may be a hand gesture, as depicted in FIG. 5. Alternatively, input 502 may be a voice command, touch input on a physical device, XR controller input, or any other suitable input. In response to receiving input 502, 2D editing frame 504 may be displayed. Additionally, a subset 506 of metadata 402 may be displayed as an overlay over or near the object to be modified.

Figure 6:
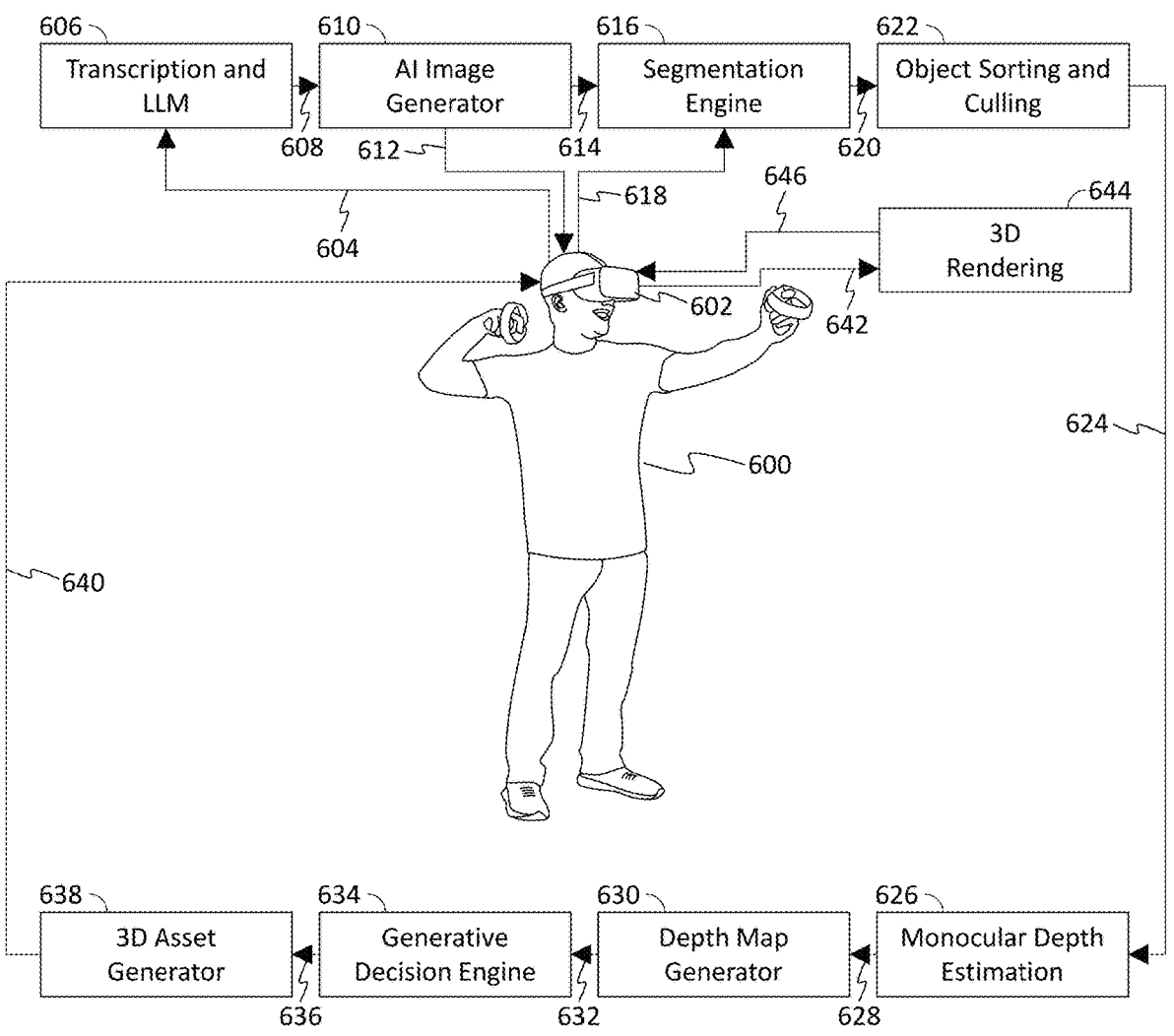
FIG. 6 is a diagram showing components and dataflow therebetween of an illustrative system for generating a 3D environment, in accordance with some embodiments of the disclosure.

FIG. 6 is a diagram showing components and dataflow therebetween of an illustrative system for generating a 3D environment, in accordance with some embodiments of the disclosure. User 600 may be designing a level for a 3D video game. For example, user 600 may generate, edit, place, or project objects in 3D to create their desired 3D scene. User 600 may wear XR device 602 in order to create, view, and interact with 3D content. The 2D editing frame may be displayed to user 600 on XR device 602. User 600 may use the 2D editing frame as the main tool when interacting with the 2D and 3D art transition. As described above, the 2D art frame may be represented as a virtual tablet device within the 3D environment, or may be a cylindrical projection or dome surrounding user 600.

User 600 provides an input indicating at least one object to be added to the 2D art frame. The input may be a selection of a preexisting asset, such as from an asset library, or a description of a desired object. The input may be a gesture captured by a camera or other tracking sensor of XR device 602, a controller input received from a controller paired with XR device 602, a text input received from a text input interface (e.g., a physical or virtual keyboard), or a voice input.

Voice and text inputs may require additional processing to determine what objects to add to the 2D editing frame, for instance, by transmitting 604 such inputs to transcription and LLM module 606. Transcription and LLM module 606 may be local to XR device 602 or implemented on a remote server with which XR device 602 communicates. Transcription and LLM module 606 is configured to enable interpretation of voice commands, and may be used to derive from the interpretation a prompt for a generative AI image generator. If multiple objects are indicated in the input, transcription and LLM module 606 may generate a separate prompt for each object. The prompt is then transmitted 608 to AI image generator 610. AI image generator 610 may be a commercially available generative AI service, such as OpenAI's DALL-E, or a custom generative AI system. AI image generator 610 generates an image based on the prompt. In some embodiments, one or more concept art pieces may be provided to AI image generator 610 to inform the style of artwork that should be generated. AI image generator 610 transmits 612 the generated images to XR device 602.

In some embodiments, AI image generator 610 may transmit 614 the generated images to segmentation engine 616. In some embodiments, XR device 602 transmits 618 a complete image, based on the 2D editing frame, to segmentation engine 616. In some embodiments, a copy of a physical image may be captured and transmitted to segmentation engine 616 for analysis. Segmentation engine 616 analyzes the image or images received from either AI image generator 610 or XR device 602 to identify individual objects within the images. Segmentation engine 616 may use any suitable object recognition technique to identify individual objects in an image, and then breaks apart the image into segments, each segment comprising a single identified object. These segments can then be converted into individual sprites and mapped to locations within the 2D editing frame using mapping techniques, such as UV projection or sprite map generation.

After segmenting the 2D image into individual objects, segmentation engine 616 transmits 620 the segments to object sorting and culling module 622. Object sorting and culling module 622 analyzes objects generated by AI image generator circuitry to identify any objects that were not selected or otherwise should not be projected as individual sprites in the 3D scene. This may be accomplished using a simple index or lookup table so that the system can keep track of which objects should and should not be projected into the 3D scene. Any object that should not be projected is then culled or removed from the set of segments generated by segmentation engine 616. This may have the benefit of reducing further expenditure of system resources in processing 2D segments/sprites into a 3D scene by reducing the number of 2D segments/sprites needing to be projected into the 3D scene.

Object sorting and culling module 622 then transmits 624 the 2D image and the remaining set of segments/sprites (e.g., the segments/sprites that are to be projected into the 3D scene) to monocular depth estimation module 626. Object sorting and culling module 622 may include, in transmission 524, metadata describing each segment/sprite including the position of each segment/sprite within the 2D image. Monocular depth estimation module 626 identifies the depth of each object within the 2D image, and writes a depth variable to the metadata of the corresponding segment/sprite. This depth variable can be used to place the segment/sprite at the correct depth within the 3D scene. Depth variables can also be used for scaling an object up or down within the 2D editing frame, or within the 3D scene based on the user's point of view or perspective of the 3D scene from a given position within the 3D environment. For example, a tree may be placed in front of a mountain (e.g., the mountain has a higher value depth variable than the tree) from a user's point of view. The tree may be enlarged by a first factor as it is projected into the 3D scene, while the mountain may be enlarged by a second factor larger than the first factor if it is to be placed far behind the tree. The amount by which to scale an object may be calculated as a function of the object's depth variable and the number of pixels the 2D sprite covers in the original 2D image from which the 3D objects are generated.

Depth variables generated by monocular depth estimation module 626 are transmitted 628 to depth map generator 630. Depth map generator 630 generates a depth map of the 2D image, which may be presented to the user. A color gradient may be applied to the 2D image, where one end of the color spectrum (e.g., red) represents objects with the lowest depth values (e.g., closest to the "front" of the image) and the opposite end of the color spectrum (e.g., violet) represent objects with highest depth values (e.g., farthest from the "front" of the image). The depth map may be a togglable overlay over the 2D editing frame. The user may adjust the placement of objects within the 2D editing frame, including modifying the assigned depth variables of each object.

Once a depth has been assigned to each object and the user is satisfied with placement of each object (e.g., an input is received from the user accepting the current contents of the 2D editing frame as ready for 3D projection), depth map generator 630 transmits 632 the depth variables for each object, along with the 2D image and other associated metadata, to generative decision engine 634. Generative decision engine 634 enables a generative decision engine that looks at the generated sprites for the 2D editing frame and determines which sprites should, or could, be generated as 3D artwork. This process may be similar to the segmentation process described above. An AI engine may observe and attempt to tag each object in the 2D editing frame. This may be facilitated by metadata generated by segmentation engine 616. In some embodiments, metadata generated for a given object by segmentation engine 616 is used by generative decision engine 634 as a weighting factor for that object. In some embodiments, generative decision engine 634 may employ external AI models optimized for tagging objects in a 2D image. If an object is recognized, a descriptive tag may be generated by generative decision engine 634 (or received from an external AI model), which can be used to search a database or other store of 3D objects. Alternatively, the descriptive tag may be used as a prompt for a 3D generative AI system. The descriptive tags for each object are transmitted 636 to 3D asset generator 638, which retrieves or generates a 3D object for each descriptive tag. In some cases, existing 3D objects identified for a given 2D object may be presented to the user prior to projection into the 3D scene. If the user is satisfied with an existing 3D object, the user may choose to continue with the existing 3D object. If the user is not satisfied, then 3D asset generator 638 may use the descriptive tag as a prompt for a 3D generative AI system. It may also be possible to generate a new 3D object based on 2D artwork, provided that multiple perspectives of the 2D object are provided.

3D asset generator 638 transmits 640 the retrieved or generated 3D objects to XR device 602, along with 3D position information and/or other metadata for each 3D object. In some embodiments, the retrieved or generated 3D objects are transmitted 640 to XR device 602 as they are retrieved, generated, or otherwise become available, rather than all at once. The 3D position information is based on 2D position information from the 2D editing frame and the depth variables generated by depth map generator 630. In some embodiments, 3D rendering module 644 resides on XR device 602. XR device 602 then transmits 642 the 3D objects and all associated metadata to 3D rendering module 644. In other embodiments, 3D rendering module 644 may reside on a server or other equipment outside of XR device 602. In such cases, the 3D objects are transmitted directly to 3D rendering module 644. 3D rendering module 644 projects each 3D object into a 3D scene at the appropriate position, orientation, and scale based on the associated metadata. 3D rendering module 644 then transmits 646 the rendered 3D scene to XR device 602 for display to the user.

While viewing the 3D scene, the user may wish to alter one or more objects, or add additional objects to the 3D scene. An input from the user may toggle display of the 2D art frame, either as an overlay over the 3D scene or as a virtual tablet device that the user can interact with within the 3D environment. The user can then iterate through different modifications to the 3D scene, causing one or more of the processes described above to be repeated each time. The input to toggle display of the 2D editing frame may cause the 2D editing frame to be regenerated based on the user's current perspective of the 3D scene. 3D rendering module 644 may perform a 2D capture process in which the 3D position, scale, and depth of each object currently within the user's field of view are translated to a 2D position, scale, and layer in a 2D editing frame. The resulting 2D editing frame may then be transmitted to XR device 602 for display. This newly generated 2D editing frame may preserve the individual objects such that the user may edit one object's position, scale, or depth without having to then regenerate every 3D object. The user may edit objects in the 2D editing frame or directly in the 3D environment. Any changes made in the 2D editing frame are reprojected by 3D rendering module 644 into the 3D scene, and any changes made directly in the 3D environment are reflected in the 2D editing frame.

Figure 7:
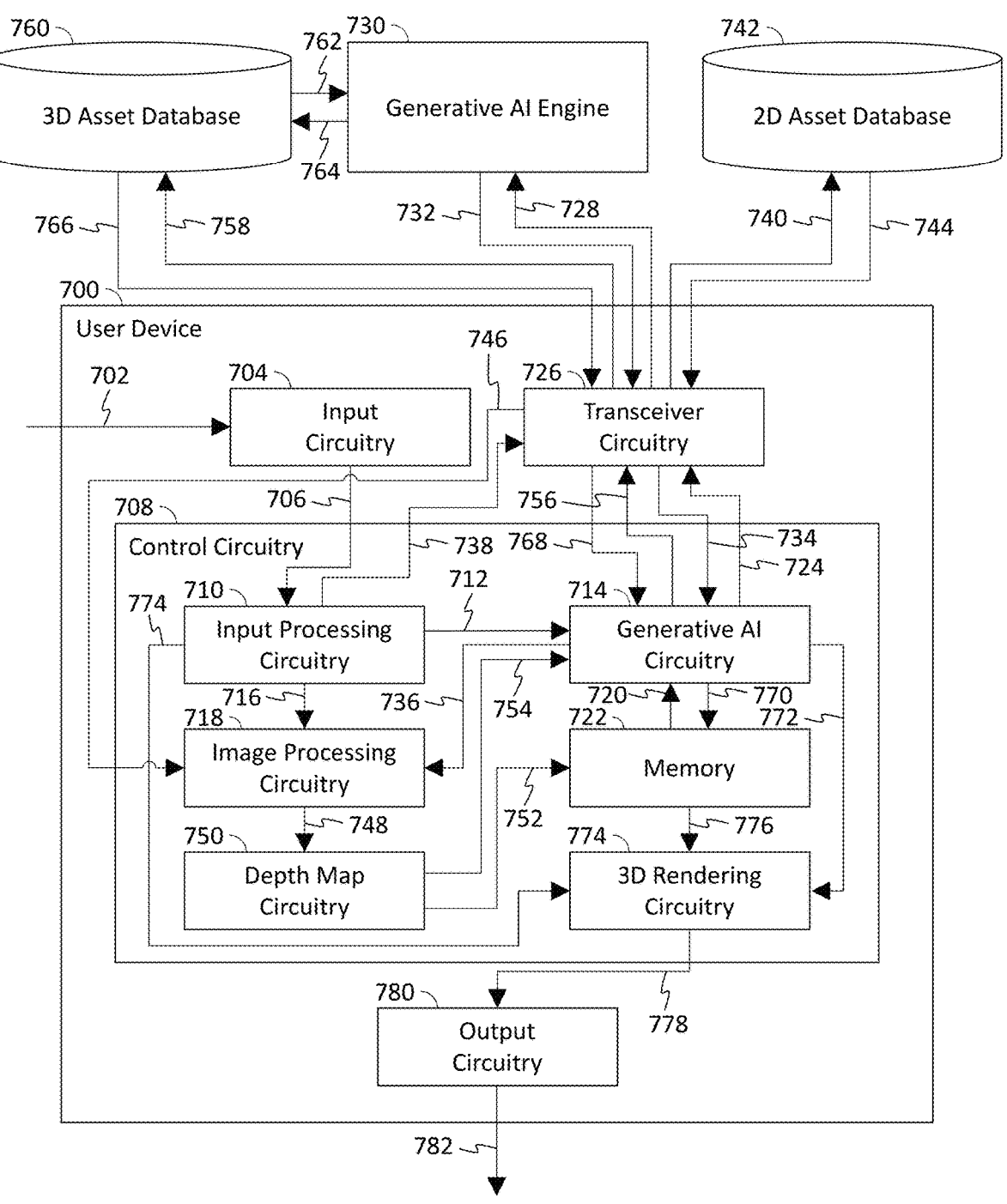
FIG. 7 is a block diagram representing components and dataflow therebetween of a system for generating 3D environments, in accordance with some embodiments of the disclosure.

FIG. 7 is a block diagram representing components and dataflow therebetween of a system for generating 3D environments, in accordance with some embodiments of the disclosure. User device 700 (e.g., XR device 602) may receive a user input 702 using input circuitry 604. Input circuitry 704 may be a microphone for capturing voice commands or a data interface for receiving inputs from a keyboard, remote control, XR device controller, or any other suitable input device. Input circuitry 704 transmits 706 the received input to control circuitry 708. Control circuitry 708 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, filed-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 708 receives the input using input processing circuitry 710. Input processing circuitry 710 may transcribe voice inputs to text and identify commands contained within the transcribed text. Input processing circuitry 710 may similarly process inputs received as text to identify commands contained therein. Input processing circuitry 710 may also be configured to decode data received from input devices. For example, input processing circuitry 610 may identify commands by decoding data received from a remote control device or motion and/or position data received from one or more XR controllers. Input processing circuitry 610 may extract and/or derive, from the processed input, indications of one or more objects to be inserted into a 2D editing frame. For example, a user may say "Put a bench on the left, a potted plant to the right of the bench, and a lamppost behind the right side of the bench" as a voice input. Input processing circuitry 710 transcribes this input into text and then, using natural language processing, LLMs, or other suitable methods, identifies three discrete objects in the input: a bench, a potted plant, and a lamppost. Input processing circuitry 710 transmits 712 an indication of each of these objects to generative AI circuitry 714. In some embodiments, input processing circuitry 710 also identifies any positioning information indicated in the input. For example, input processing circuitry 710 may identify that the bench should be "on the left" while the potted plant should be "to the right of the bench" and the lamppost should be "behind the right side of the bench." Input processing circuitry 710 may also derive relative positions for each object based on these natural language indications of position. Input processing circuitry 710 may then transmit 712 such positioning information to generative AI circuitry

714 and/or transmit 716 such positioning information to image processing circuitry 718.

Generative AI circuitry 714 may comprise AI image generator 610, generative decision engine 634, and 3D asset generator 638. Generative AI circuitry 714 generates and/or retrieves 2D images for each identified object to be placed in the 2D editing frame. Generative AI circuitry 714 may use a local generative AI engine or a remotely hosted generative AI engine. A basic or custom implementation of a commercially available AI engine, such as DALL-E, may be used. Generative AI circuitry 714 may use an LLM or other natural language AI model to generate a prompt for each identified object. In some embodiments, generative AI circuitry 714 may retrieve 720, from memory 722, information describing the look and feel of the 3D scene the user wishes to create, such as a particular art style, color palette, location, time period, etc. Memory 722 may be any suitable electronic storage device such as random-access memory, read-only memory, hard drives, optical drives, solid state devices, quantum storage devices, or any other suitable fixed or removable storage devices, and/or any combination of the same. Generative AI circuitry 714 may use the retrieved information to generate more detailed prompts for each object.

Generative AI circuitry 714 transmits 724 the prompts to transceiver circuitry 726. Transceiver circuitry 726 may comprise a network connection over which data can be transmitted to and received from remote devices, such as an Ethernet connection, Wi-Fi connection, mobile broadband interface, or connection employing any other suitable network protocol. Transceiver circuitry 726 in turn transmits 728 the prompts to generative AI engine 730. Generative AI engine 730 may be implemented locally or on a remote server. Generative AI engine 728 generates an image based on the prompts. In some embodiments, generative AI engine 730 generates a single image including all identified objects by considering all the prompts together. In other embodiments, each prompt is processed separately by generative AI engine 730 to create a separate image for each object. User device 700 receives 732 the generated image(s) from generative AI engine 730 using transceiver circuitry 726, which in turn transmits 734 the received image(s) to generative AI circuitry 714. Once images for each object have been received, generative AI circuitry 714 transmits 736 the images to image processing circuitry 718.

In some embodiments, alternatively or additionally, input processing circuitry 710 transmits 738 the indication of each object to transceiver circuitry 714. Transceiver circuitry 714 in turn transmits 740 the indication of each object to 2D asset database 742. 2D asset database 742 may contain a store or catalog of prerendered 2D assets for a variety of objects and object types. A 2D asset matching the indication of each object is then transmitted 744 to user device 700. Transceiver circuitry 714 receives and, in turn, transmits 746 the 2D assets to image processing circuitry 718.

Image processing circuitry 718 may comprise segmentation engine 616, object sorting and culling module 622, and monocular depth estimation module 626. Image processing circuitry 616 analyzes the image or images received from generative AI circuitry 714 to identify individual objects within the images. Image processing circuitry 718 may use any suitable object recognition technique to identify individual objects in an image and then breaks apart the image into segments, each segment comprising a single identified object. These segments can then be converted into individual sprites and mapped to locations within the 2D editing frame using existing mapping techniques, such as UV projection or sprite map generation.

After segmenting the 2D image into individual objects, image processing circuitry 718 analyzes the objects to identify any objects that should not be projected as individual sprites in the 3D scene. This may be accomplished using a simple index or lookup table so that the system can keep track of which objects should not be projected into the 3D scene. Any object that should not be projected is then culled from the set of segments. This may have the benefit of reducing further expenditure of system resources in processing 2D segments/sprites into a 3D scene by reducing the number of 2D segments/sprites needing to be projected into the 3D scene.

Image processing circuitry 718 may generate metadata describing each segment/sprite including the position of each segment/sprite within the 2D image. Image processing circuitry 718 may then perform monocular depth estimation to identify the depth of each object within the 2D image. The identified depths are then written as depth variables to the metadata of the corresponding segments/sprites. These depth variables can then be used later to place each segment/sprite at the correct depth within the 3D scene. Depth variables can also be used for scaling an object up or down within the 2D editing frame, or within the 3D scene based on the user's point of view of perspective of the 3D scene from a given position within the 3D environment. For example, a tree may be placed in front of a mountain (i.e., the mountain has a higher value depth variable than the tree) from a user's point of view. The tree may be enlarged slightly as it is projected into the 3D scene, while the mountain may be enlarged more if it is to be placed far behind the tree. The amount by which to scale an object may be calculated as a function of the object's depth variable and the number of pixels the 2D sprite covers in the original 2D image from which the 3D objects are generated.

Image processing circuitry 718 transmits 748 the 2D segments/sprites and/or the original 2D image, along with the corresponding metadata, to depth map circuitry 750. Depth map circuitry 750 may comprise depth map generator 630. Depth map circuitry 750 generates a depth map of the 2D image, which may be presented to the user. A color gradient may be applied to the 2D image, where one end of the color spectrum (e.g., red) represents objects with the lowest depth values (i.e., closest to the "front" of the image) and the opposite end of the color spectrum (e.g., violet) represents objects with highest depth values (i.e., farthest from the "front" of the image). The depth map may be a togglable overlay over the 2D editing frame. The user may adjust the placement of objects within the 2D editing frame, including modifying the assigned depth variables of each object. Depth map circuitry 750 then transmits 752 at least the depth variables for each segment to memory 722. In some embodiments, depth map circuitry 750 transmits all the metadata corresponding to each segment, including 2D position information, the depth variables, descriptions of the object, and/or the prompt used to generate the object, to memory 722. Depth map circuitry 750 also transmits 754 these metadata to generative AI circuitry 714.

Generative AI circuitry 714 generates or retrieves 3D assets for each 2D segment/sprite. Once a depth has been assigned to each object and the user is satisfied with placement of each object (e.g., an input is received from the user accepting the current contents of the 2D editing frame as ready for 3D projection), generative AI circuitry 714 analyzes the segments/sprites and determines which sprites should, or could, be generated as 3D artwork. This process may be similar to the segmentation process described above. An AI engine may observe and attempt to tag each object in the 2D editing frame. This may be facilitated by metadata generated by image processing circuitry 718 or depth map circuitry 750, which may be retrieved from memory 722 or received at generative AI circuitry 714 directly from depth map circuitry 740 as described above. In some embodiments, metadata generated for a given object is used as a weighting factor for that object by generative AI circuitry 714. In some embodiments, generative AI circuitry 714 may employ external AI models optimized for tagging objects in a 2D image. If an object is recognized, a descriptive tag may be generated by generative AI circuitry 714 (or received from an external AI model), which can then be used to search a database or other store of 3D objects. Generative AI circuitry 714 may transmit 756 the tag, or a prompt generated from the tag, to transceiver circuitry 726, which in turn transmits 758 the tag or prompt to 3D asset database 760. 3D asset database 760 may store pre-rendered 3D assets for a variety of objects, or resource locators for pre-rendered 3D assets. If a suitable 3D asset for a given tag or prompt is not found in 3D asset database 760, the tag or prompt may be transmitted 762 to generative AI engine 730. Generative AI engine 730 may then generate a new 3D asset based on the tag or prompt, and transmit 764 the new 3D asset to 3D asset database 760. The new 3D asset may then be stored in 3D asset database 760 for future use. 3D asset database 760 then transmits 766 an appropriate 3D asset (either a pre-rendered asset or a new asset) to user device 700, which receives the 3D asset at transceiver circuitry 726. Transceiver circuitry 726 then transmits 768 the 3D asset to generative AI circuitry 714. Generative AI circuitry 714 then transmits 770 the received 3D asset to memory 722 for local storage. Generative AI circuitry 714 also transmits 772 any received 3D assets to 3D rendering circuitry 774.

3D rendering circuitry 774 is configured to generate a 3D scene and to place each 3D asset at a position within the 3D scene according to the positional information in the metadata of the corresponding object. 3D rendering circuitry 774 may retrieve 776 3D assets from memory 722 for placement within the 3D scene. 3D rendering circuitry 774 may place, scale, and orient each 3D asset according to its corresponding metadata. Once fully rendered, 3D rendering circuitry 774 transmits 778 the rendered 3D scene to output circuitry 780. Output circuitry 780 is configured to output 782 the 3D scene on a display of a user device. The 3D scene may be displayed on an XR device, such as XR device 602, or flattened to a 2D perspective for display on a 2D display. The user can then review and edit the 3D scene. If the user is not satisfied with a 3D asset in the scene, the above process may be repeated to generate alternative 3D assets until the user is satisfied. Additionally, while viewing the 3D scene, an input may be received from the user indicating a desire to edit the 3D scene. Input processing circuitry 710 may transmit 674 a command to 3D rendering circuitry 774 to toggle display of the 2D editing frame within the 3D scene. 3D rendering circuitry 774 may generate for display a 3D representation of a tablet device on which the 2D editing frame is displayed and with which the user can interact within the 3D scene to perform edits. 3D rendering circuitry 774 may also render display of metadata associated with an object to be edited in response to user selection of such an object.

In some embodiments, input circuitry 704 includes a camera or other imaging device. Input circuitry 704 captures an image of a drawing, storyboard, or other physical image. Input circuitry 704 may transmit the captured image to control circuitry 708, where it is processed using image processing circuitry 718 to identify one or more objects in the captured image. Control circuitry 708 then generates, requests, or retrieves a 2D asset for each identified object. The 2D assets are added to the 2D editing frame in positions corresponding to their positions in the captured image. The 2D assets are then projected into the 3D scene using 3D rendering circuitry 774.

Figure 8:
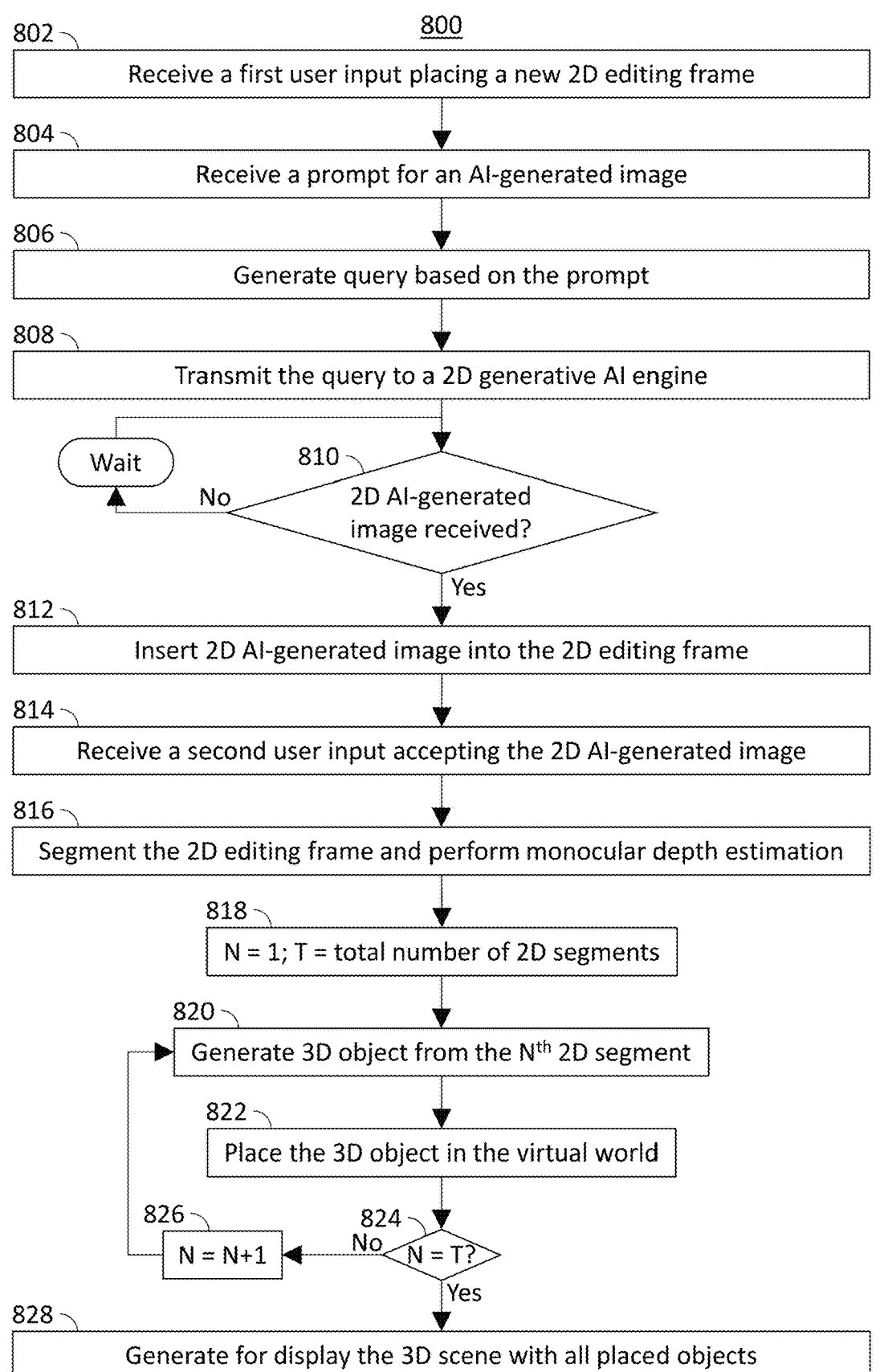
FIG. 8 is a flowchart representing an illustrative process for generating a 3D environment, in accordance with some embodiments of the disclosure.

FIG. 8 is a flowchart representing an illustrative process 800 for generating a 3D environment, in accordance with some embodiments of the disclosure. Process 800 may be implemented at least in part by control circuitry 708. In addition, one or more actions of process 800 may be incorporated into or combined with one or more actions of any other process or embodiment described herein.

At 802, control circuitry 708 receives a first user input to place a 2D editing frame. For example, a user input may be received to initialize a 2D editing environment. The input may be a voice input, a text input, or selection of an icon, menu item, or other user interface element. In response to the input, control circuitry 708 initializes a 2D editing environment and places a new 2D editing frame to which 2D assets may be added.

At 804, control circuitry 708 receives a prompt for an AI-generated image. The prompt may be received as a user input, or may be generated based on a user input. For example, the user may enter a text or voice prompt describing an object to be added to the 2D editing frame, such as "a wooden park bench with metal legs, three pieces of light-colored wood for the seat and four pieces of light-colored wood for the back." In another example, the user may enter a text or voice input that identifies an object in simple terms, such as "a bench." Control circuitry 708 may generate a prompt based on this simple input.

At 806, control circuitry 708 generates a query based on the prompt. For example, control circuitry 708 may generate a query transmission comprising the prompt to be transmitted to a generative AI engine. The query may be generated in any suitable transmission protocol format, such as an HTTP GET request. At 808, control circuitry 708 transmits the query to the generative AI engine.

At 810, control circuitry 708 determines whether a 2D AI-generated image has been received from the generative AI engine in response to the query. If not ("No" at 810), then control circuitry 708 continues to wait for receipt of an image. Once the image has been received ("Yes" at 810), then, at 812, control circuitry 708 inserts the 2D AI-generated image into the 2D editing frame. The location at which the image is placed within the frame may be arbitrary or may be based on positional information indicated in the prompt. Further inputs may be received from the user to change the position, orientation, or scale of the image.

At 814, control circuitry 708 receives a second user input accepting the 2D AI-generated image. Sometimes an AI-generated image may not be exactly what the user is looking for. The user may request that the generative AI engine regenerate an image for a given object until a satisfactory image is produced. Once the user is satisfied, they may enter an input indicating that the image is acceptable. This may be an explicit input (e.g., selection of an "OK" option presented to the user in the 2D editing frame) or an implicit acceptance of the image through an input comprising a prompt for a new object.

At 816, control circuitry 708 segments the 2D editing frame and performs monocular depth estimation. As described above, control circuitry 708 generates individual segments for each object contained in the 2D editing frame.

Control circuitry 708 uses monocular depth estimation to determine relative depths of all the segments. 3D spatial coordinates for each object are then calculated or extrapolated from the 2D position and relative depth information of each segment.

At 818, control circuitry 708 initializes a counter variable N, setting its value to an initial value (e.g., one), and a variable T representing the total number of 2D segments. At 820, control circuitry 708 generates a 3D object from the $N^{th}$ 2D segment. For example, the $N^{th}$ 2D segment and any corresponding metadata may be transmitted to a 3D generative AI engine to produce a corresponding 3D object. At 822, the 3D object is placed in the virtual or digital world (e.g., the 3D scene).

At 824, control circuitry 708 determines whether N is equal to T, meaning that a 3D object has been generated for every 2D segment. If N is not equal to T ("No" at 824), then, at 826, control circuitry 708 increments the value of N by one, and processing returns to 820. If N is equal to T ("Yes" at 824), then, at 828, control circuitry 708 generates for display the 3D scene with all placed objects.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
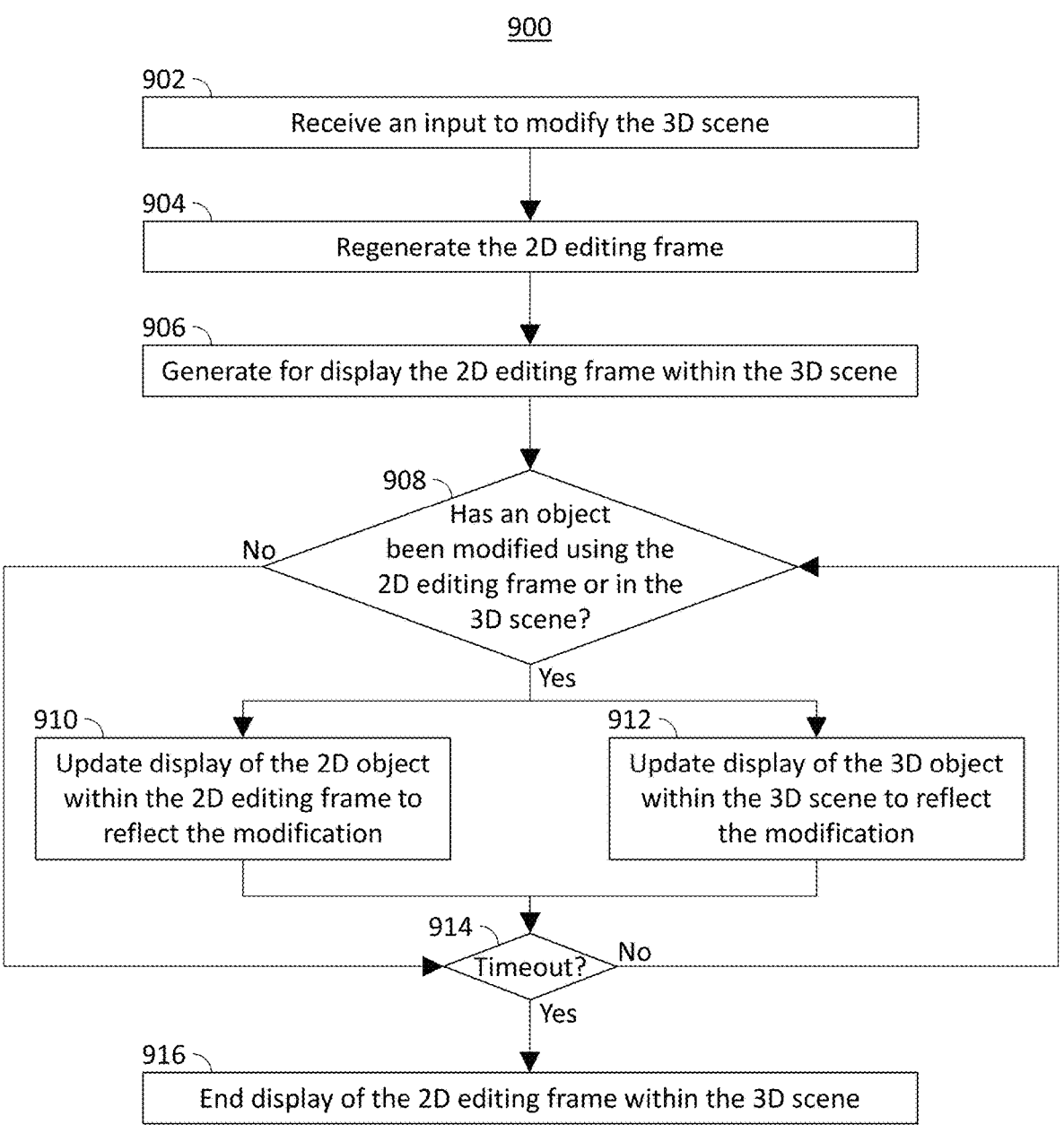
FIG. 9 is a flowchart representing an illustrative process for editing objects displayed in a 3D environment using a 2D editing frame, in accordance with some embodiments of the disclosure.

FIG. 9 is a flowchart representing an illustrative process 900 for editing objects displayed in a 3D environment using a 2D editing frame, in accordance with some embodiments of the disclosure. Process 900 may be implemented at least in part by control circuitry 708. In addition, one or more actions of process 900 may be incorporated into or combined with one or more actions of any other process or embodiment described herein.

At 902, control circuitry 708 receives an input to modify the 3D scene. The input may be received as a voice command, or as a selection of an object, for instance. At 904, control circuitry 708 may regenerate the 2D editing frame. Control circuitry 708 may retrieve a latest version of the 2D editing frame from memory, or may create a new 2D editing frame in which objects are placed in positions corresponding to the user's current view and/or perspective of the 3D scene. At 906, control circuitry 708 generates the 2D editing frame for display within the 3D scene. In response to the input, control circuitry 708 may also generate for display metadata associated with an object to be edited. For example, the current 2D or 3D position information, width, height, description, or prompt from which the object was generated may be displayed to the user. This information may be updated as the user edits the object.

At 908, control circuitry 708 determines whether an object has been modified. The user may modify an object directly within the 3D scene or within the 2D editing frame. The user may reposition or scale the object within either the 2D editing frame or the 3D scene. The user may also edit the description or prompt, which may cause control circuitry 708 to regenerate or otherwise request regeneration of the object based on the modified description or prompt. If an object has been modified ("Yes" at 908), then, at 910, control circuitry 708 updates display of the 2D object within the 2D editing frame to reflect the modification. Control circuitry 708 also updates, at 912, display of the 3D object within the 3D scene to reflect the modification.

After updating display of the modified object in the 2D editing frame and the 3D scene, or if no object has been modified ("No" at 908), at 914, control circuitry 708 determines whether a timeout has occurred. For example, if no objects have been modified within a threshold period of time from receipt of the input to modify the 3D scene or receipt of an actual modification, control circuitry 708 may determine that the user does not intend to make any further modifications, and display of the 2D editing frame will time out. If the threshold period has not elapsed ("No" at 914), then processing returns to 908. If the threshold period has elapsed ("Yes" at 914), then a timeout has occurred and, at 916, control circuitry 708 ends display of the 2D editing frame within the 3D scene.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
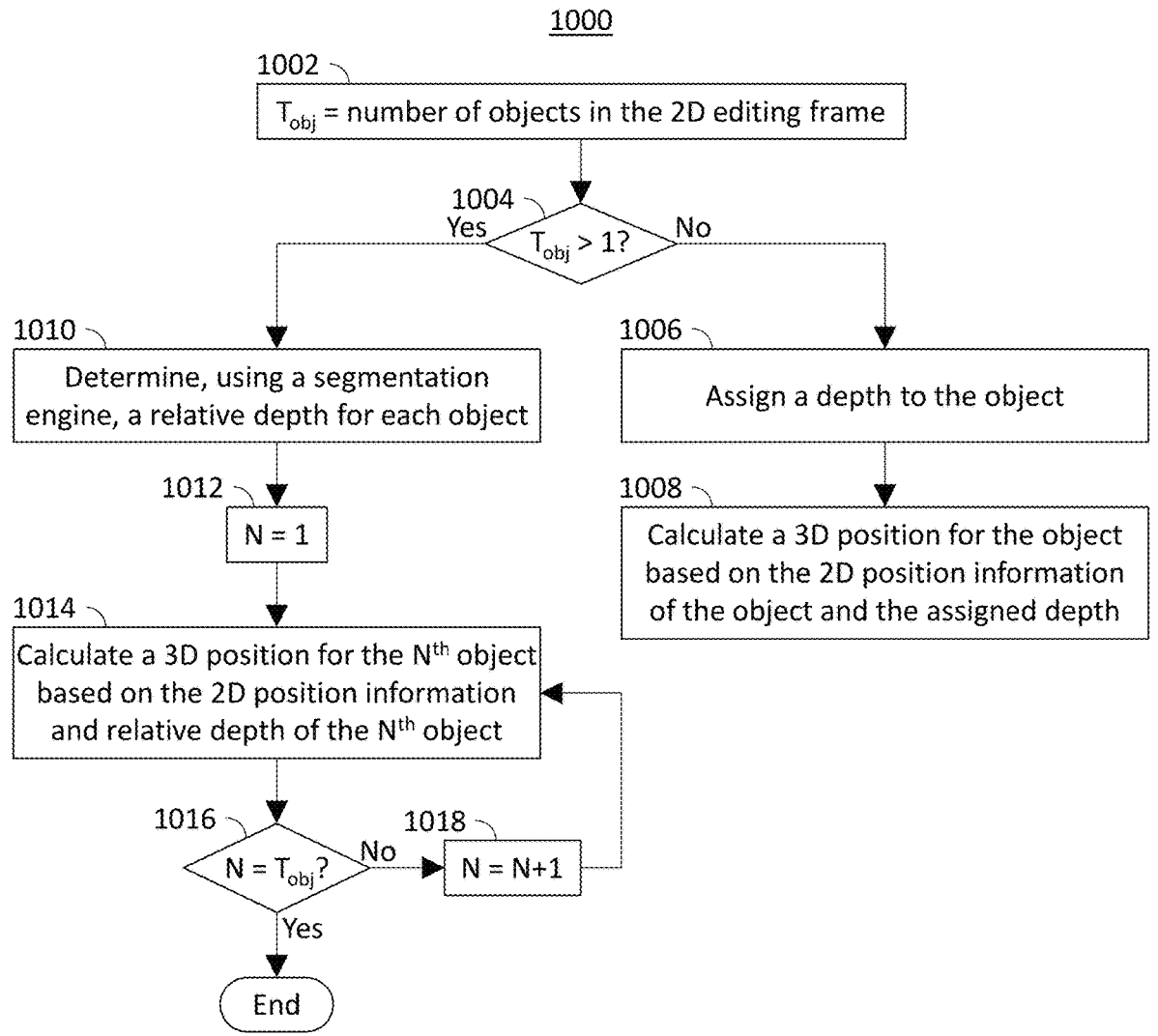
FIG. 10 is a flowchart representing an illustrative process for calculating 3D positions for objects displayed in a 2D editing frame, in accordance with some embodiments of the disclosure.

FIG. 10 is a flowchart representing an illustrative process 1000 for calculating 3D positions for objects displayed in a 2D editing frame, in accordance with some embodiments of the disclosure. Process 1000 may be implemented at least in part by control circuitry 708. In addition, one or more actions of process 1000 may be incorporated into or combined with one or more actions of any other process or embodiment described herein.

At 1002, control circuitry 708 initializes a variable $T_{obj}$ representing the number of objects in the 2D editing frame. At 1004, control circuitry 608 determines whether $T_{obj}$ is greater than one (i.e., whether there is more than one object in the 2D editing frame). If $T_{obj}$ is not greater than one ("No" at 1004), then, at 1006, control circuitry 708 assigns a depth to the object. The assigned depth may be arbitrarily assigned as a medium-value depth to place the object in neither the foreground nor the background. In some embodiments, control circuitry 708 may use scale information (e.g., the width and height of the 2D object) to derive a depth value for the object. For example, a bench having a width of 300 pixels may be a foreground object, while a bench having a width of only 50 pixels may be a background object.

At 1008, control circuitry 708 calculates a 3D position for the object based on the 2D position information of the object and the assigned depth. For example, control circuitry 708 may translate the horizontal coordinate of an object within the 2D editing frame to a radial coordinate around an origin point within the 3D scene. The vertical coordinate of the object may be preserved or may be scaled based on the assigned depth. The assigned depth may be translated to a distance from the origin point along a radial line at an angle from the origin corresponding to the radial coordinate.

If there is more than one object in the 2D editing frame ("Yes" at 1004), then, at 1010, control circuitry 708 determines, using a segmentation engine, a relative depth for each object. This may be accomplished using methods described above in connection with FIGS. 6 and 7. At 1012, control circuitry 708 initializes a counter variable N, setting its value to one. At 1014, control circuitry 708 calculates a 3D position for the $N^{th}$ object based on the 2D position information and relative depth of the $N^{th}$ object. This may be accomplished using methods similar to those discussed above in connection with steps 1006 and 1008.

At 1016, control circuitry 708 determines whether N is equal to $T_{obj}$, meaning that 3D positions have been calculated for all objects in the 2D editing frame. If N is not equal to $T_{obj}$ ("No" at 1016), then, at 1018, control circuitry 708 increments the value of N by one, and processing returns to 1014. If N is equal to $T_{obj}$ ("Yes" at 1016), then the process ends.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
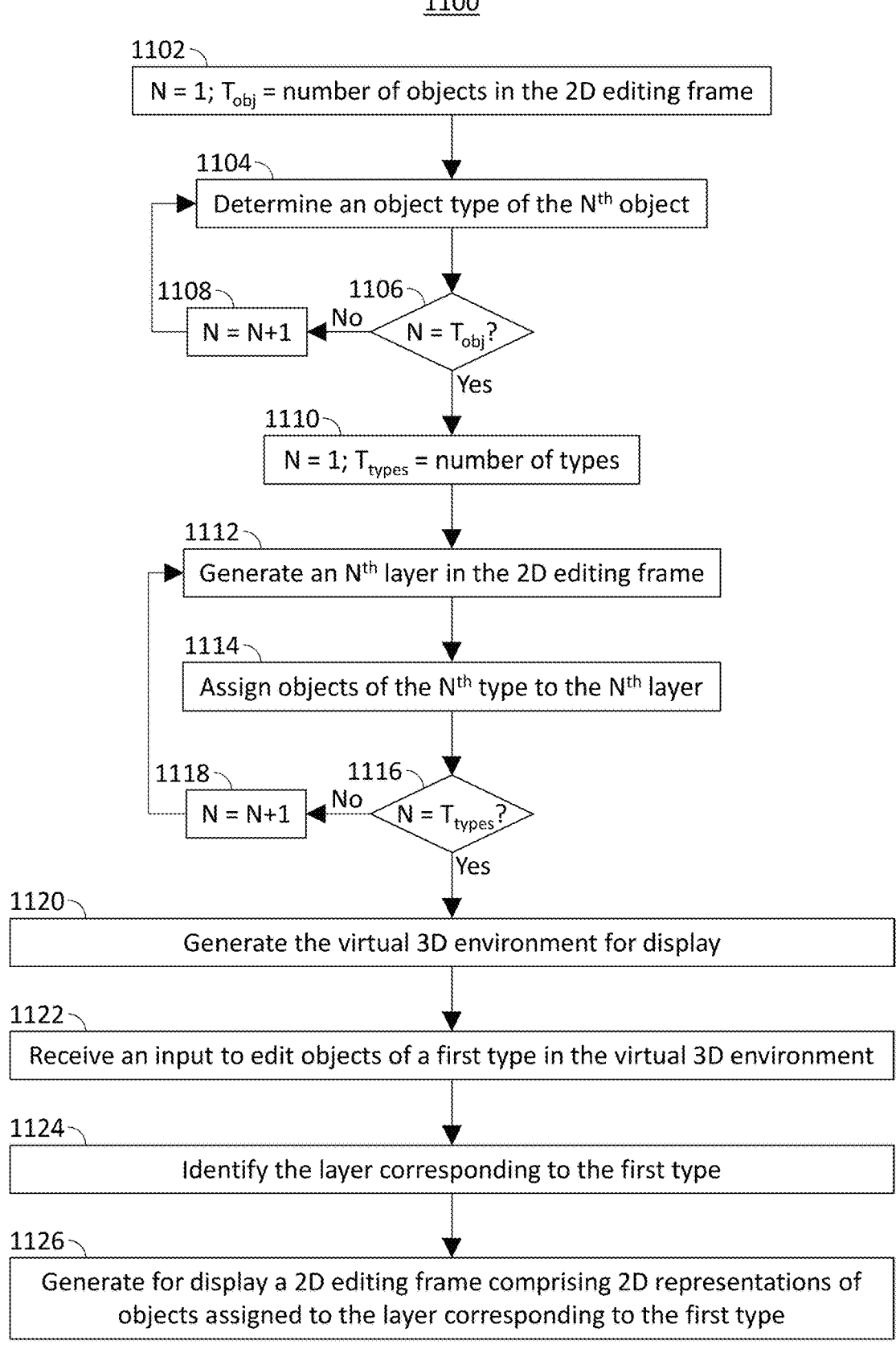
FIG. 11 is a flowchart representing an illustrative process for assigning objects to different layers, in accordance with some embodiments of the disclosure.

FIG. 11 is a flowchart representing an illustrative process 1100 for assigning objects to different layers, in accordance with some embodiments of the disclosure. Process 1100 may be implemented at least in part by control circuitry 708. In addition, one or more actions of process 1100 may be incorporated into or combined with one or more actions of any other process or embodiment described herein.

At 1102, control circuitry 708 initializes a counter variable N, setting it to an initial value (e.g., one), and a variable $T_{obj}$ representing the number of objects in the 2D editing frame. At 1104, control circuitry 708 determines an object type of the $N^{th}$ object. For example, control circuitry 708 may use a lookup table or other relational data structure to determine a type of the $N^{th}$ object based on its description metadata. A bench may have a type "seating," while a potted plant may be identified has having a type "flora." At 1106, control circuitry 708 determines whether N is equal to $T_{obj}$, meaning that a type has been determined for each object in the 2D editing frame. If N is not equal to $T_{obj}$ ("No" at 1106), then, at 1108, control circuitry 708 increments the value of N by one, and processing returns to 1104.

If N is equal to $T_{obj}$ ("Yes" at 1106), then, at 1110, control circuitry 708 resets the value of N to one and initializes a variable $T_{types}$ representing the number of unique types of objects identified. For example, the identified type of an object may be added to the metadata associated with that object. Control circuitry 708 may then review the metadata of all the objects and count the number of unique types of objects.

At 1112, control circuitry 708 generates an $N^{th}$ layer in the 2D editing frame. At 1114, control circuitry 708 assigns all objects of the $N^{th}$ type to the $N^{th}$ layer. This may be accomplished using any known methods for layered editing. At 1116, control circuitry 708 determines whether N is equal to $T_{types}$, meaning that layers have been created for each type of object in the 2D editing frame. If N is not equal to $T_{types}$ ("No" at 1116), then, at 1118, control circuitry 708 increments the value of N by one, and processing returns to 1112. If N is equal to $T_{types}$ ("Yes" at 1116), then, at 1120, control circuitry 708 generates the virtual or digital 3D environment (i.e., the 3D scene) for display to the user.

At 1122, control circuitry 708 receives an input to edit objects of a first type in the virtual or digital 3D environment. The input may be any suitable type of input as discussed above in connection with FIG. 9, for instance. At 1124, control circuitry 708 identifies the layer associated with the first type. For example, control circuitry 708 may access metadata associated with one object of the first type and retrieve a layer identifier. At 1126, control circuitry 708 generates for display a 2D editing frame comprising 2D representations of objects assigned to the layer corresponding to the first type. The 2D editing frame may be generated or regenerated as described above in connection with FIG. 6. In some embodiments, objects from other layers may be displayed in a "greyed out" or locked state (not shown) such that they cannot be edited. This allows the user to view the objects of the desired type in relation to other objects already placed in the 2D editing frame or 3D scene.

The actions and descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
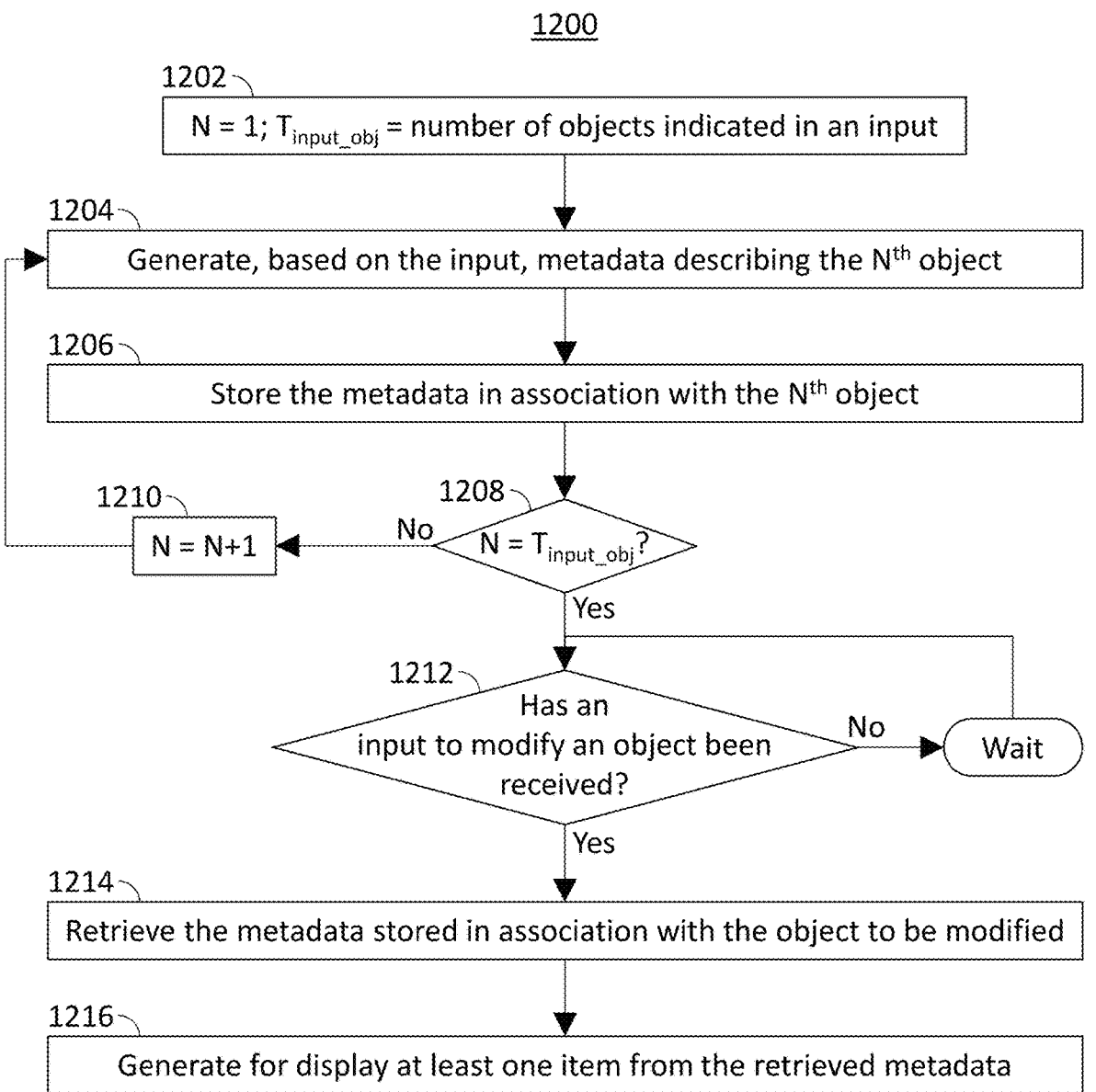
FIG. 12 is a flowchart representing an illustrative process for storing and retrieving metadata describing objects added to the 2D editing frame and/or 3D environment, in accordance with some embodiments of the disclosure.

FIG. 12 is a flowchart representing an illustrative process 1200 for storing and retrieving metadata describing objects added to the 2D editing frame and/or 3D environment, in accordance with some embodiments of the disclosure. Process 1200 may be implemented at least in part by control circuitry 708. In addition, one or more actions of process 1200 may be incorporated into or combined with one or more actions of any other process or embodiment described herein.

At 1202, control circuitry 708 initializes a counter variable N, setting it to an initial value (e.g., one), and a variable $T_{input\_obj}$ representing the number of objects indicated in an input. At 1204, control circuitry 708 generates, based on the input, metadata describing the $N^{th}$ object. This may include any type of metadata described above, such as position information, descriptions, etc. At 1206, control circuitry 708 stores the metadata in association with the $N^{th}$ object.

At 1208, control circuitry 708 determines whether N is equal to $T_{input\_obj}$, meaning that metadata has been generated and stored for each object indicated in the input. If N is not equal to $T_{input\_obj}$ ("No" at 1208), then, at 1210, control circuitry 708 increments the value of N by one, and processing returns to 1204.

If N is equal to $T_{input\_obj}$ ("Yes" at 1208), then, at 1212, control circuitry 708 determines whether an input to modify an object has been received. If not ("No" at 1212), then control circuitry 708 continues to wait for an input. If an input to modify an object has been received ("Yes" at 1212), then, at 1214, control circuitry 708 retrieves the metadata stored in association with the object to be modified. For example, an identifier of the object to be modified may be retrieved based on the input and used as a lookup value to retrieve metadata associated with that object. At 1216, control circuitry 708 generates for display at least one item from the retrieved metadata. For example, control circuitry 708 may generate for display the current position of the object, the current size of the object, the current depth of the object, the description of the object, or any other metadata describing the object.

The actions and descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
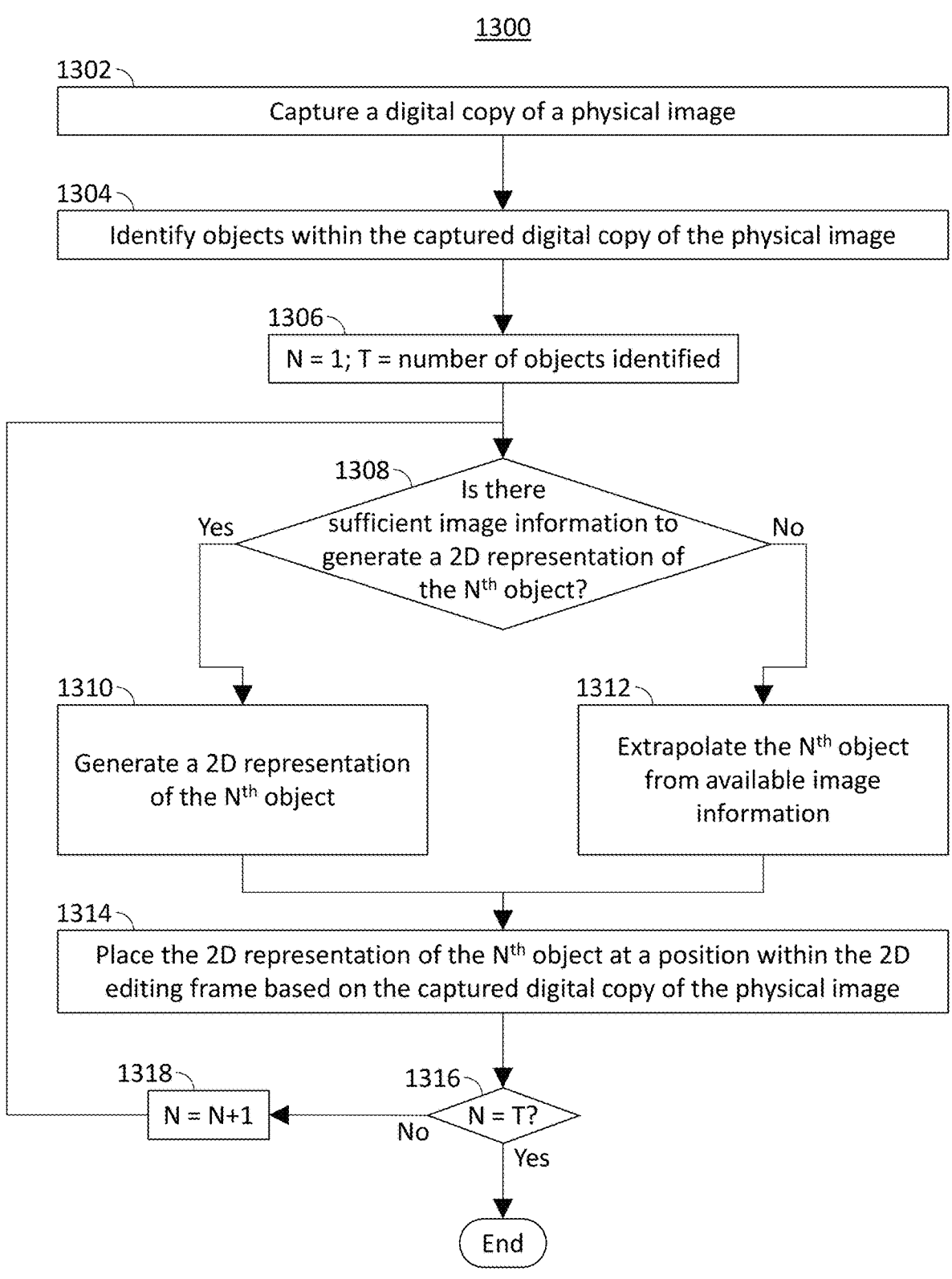
FIG. 13 is a flowchart representing an illustrative process for generating a 2D editing frame from a physical image, in accordance with some embodiments of the disclosure.

FIG. 13 is a flowchart representing an illustrative process 1300 for generating a 2D editing frame from a physical image, in accordance with some embodiments of the disclosure. Process 1300 may be implemented at least in part by control circuitry 708. In addition, one or more actions of process 1300 may be incorporated into or combined with one or more actions of any other process or embodiment described herein.

At 1302, control circuitry 708 captures a digital copy of a physical image. For example, concept art may have been hand drawn on paper or may be a printout of a project generated using graphic design software. In some cases, the user may see an image in, for example, a magazine or other publication, that they would like to use in the 3D environment. Control circuitry 708 may digitally capture the physical image. This may be accomplished using a camera integrated into user device 700. In some embodiments, the physical image may be captured using an external image capture device such as a camera or scanner and transmitted to control circuitry 708.

At 1304, control circuitry 708 identifies objects within the captured digital copy of the physical image. This may be accomplished using object recognition or a segmentation engine, as described above. At 1306, control circuitry 708 initializes a counter variable N, setting it to an initial value (e.g., one), and a variable T representing the number of objects identified in the image.

At 1308, control circuitry 708 determines whether there is sufficient image information to generate a 2D representation of the N$^{th}$ object in the image. For example, an object in the foreground of the image may be fully depicted without any obstruction. However, a background object may be overlapped by one or more objects. As more of an object is obscured, the certainty of the object's appearance decreases. This may be, for example, a linear inverse relationship. An object that is unobstructed or minimally obstructed can be used to generate a 2D representation by extrapolating any obscured portions of the object. An object that is highly obscured (e.g., more than 35% obscured) may need additional processing to effectively extrapolate the full appearance of the object.

If there is sufficient image information to generate a 2D representation of the N$^{th}$ object, meaning that the N$^{th}$ object is unobstructed or minimally obstructed ("Yes" at 1308), then, at 1310, control circuitry 708 generates a 2D representation of the N$^{th}$ object. For example, if the N$^{th}$ object is fully unobstructed, a 2D representation of the N$^{th}$ object can be generated by extracting the pixels corresponding to the object from the image. If the N$^{th}$ object is partially obstructed, a simple extrapolation of the obstructed portion may be generated. For example, a probable edge of the object may be determined (e.g., a straight line or a simple curve) to complete an outline of the object. The space enclosed by the determined edge may then be filled with a color or pattern taken from the immediately adjacent unobstructed portion of the object.

If there is insufficient image information to generate a 2D representation of the N$^{th}$ object, meaning that more than a threshold amount of the N$^{th}$ object is obstructed ("No" at 1308), then, at 1312, control circuitry 708 may extrapolate the N$^{th}$ object from available image information. For example, the unobstructed portion may be fed into a generative AI model with a prompt to fill in the obstructed portion(s). Alternatively, the available image data may be used as input for an image-based search through, e.g., Google Images or any other private or public content library. In some embodiments, the user may be prompted to provide a description of the object (e.g., an object type, shape, color, etc.) which is then fed into the generative AI model along with the unobstructed portion of the object. The generative AI model then returns one or more 2D representations of the object. The user may be prompted to choose a 2D representation to use, or to request additional variations.

At 1314, control circuitry 708 places the 2D representation of the N$^{th}$ object at a position within the 2D editing frame based on the captured digital copy of the physical image. For example, the 2D editing frame may be scaled to match the size of the captured image. Alternatively, the captured image may be scaled to fit the size of the 2D editing frame. The positions (e.g., pixel coordinates) of the N$^{th}$ object within the captured image is determined and the corresponding 2D representation is placed at a corresponding position within the 2D editing frame. If the N$^{th}$ object was obscured, its depth is set so that it will be behind the overlapping object(s).

At 1316, control circuitry 708 determines whether N is equal to T, meaning that all identified objects in the captured image have been processed. If N is not equal to T ("No" at 1316), then, at 1318, control circuitry 708 increments the value of N by one, and processing returns to 1308. If N is equal to T ("Yes" at 1316), then the process ends.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should be noted that the systems and/or methods described above may be applied to, or used in accordance with, other systems and/or methods.

What is claimed is:

1. A method for building a digital three-dimensional (3D) environment, the method comprising:
   generating for display a first two-dimensional (2D) editing frame;
   receiving a first input comprising an indication of an object to be incorporated into the editing frame, wherein the first input specifies 2D position information for the object and a description of the object;
   generating a 2D representation of the object, based on the description of the object, at a location within the 2D editing frame corresponding to the 2D position information for the object;
   calculating, based on the 2D position information, 3D position information of the object;
   generating for display a 3D representation of the object at a location within the digital 3D environment corresponding to the 3D position information of the object;
   receiving a second input to edit a current view of the digital 3D environment;
   generating for display a second 2D editing frame, wherein the second 2D editing frame comprises a 2D representation of a 3D object in the current view of the digital 3D environment;
   receiving a third input to modify at least one object in the second 2D editing frame; and
   in response to the third input, updating the 2D editing frame and the digital 3D environment.

2. The method of claim 1, wherein the first input further specifies relative depth information for the object with respect to at least one other object in the 2D editing frame.

3. The method of claim 1, wherein the object is a first object and wherein the first input further comprises 2D position information and a description of a second object to be incorporated into the 2D editing frame, the method further comprising:
   determining, using a segmentation engine, a relative depth of each object of the plurality of objects; and
   calculating a respective 3D position for each of the first object and the second object based on the 2D position information of each respective object and the relative depth of each respective object.

4. The method of claim 1, wherein the digital 3D environment is a video game environment.

5. The method of claim 1, further comprising:
   identifying a plurality of objects in the 2D editing frame;

determining, for each respective object of the plurality of objects, an object type;

assigning a first subset of one or more objects of the plurality of objects of a first type to a first layer; and assigning a second subset of one or more objects of the plurality of objects of a second type to a second layer.

6. The method of claim 5, further comprising:

receiving a fourth input to edit one or more objects of the first object type in the digital 3D environment; and generating for display a third 2D editing frame based on a current view of the digital 3D environment being displayed, wherein the third 2D editing frame comprises 2D representations of objects assigned to the first layer.

7. The method of claim 1, further comprising:

receiving a fourth input to edit a 3D representation of an object; and in response to the fourth input, updating, substantially simultaneously, the digital 3D environment and the 2D editing frame.

8. The method of claim 1, further comprising:

generating, based on the first input, metadata describing the object; and storing the metadata in association with the object.

9. The method of claim 8, further comprising:

in response to receiving the third input, retrieving the metadata stored in association with the object to be modified; and generating for display at least one metadata item from the retrieved metadata.

10. The method of claim 9, wherein the metadata item comprises a natural language portion of the first input.

11. The method of claim 1, further comprising:

capturing a digital copy of a physical image, wherein generating for display a first 2D editing frame comprises:

identifying an object depicted in the captured digital copy of the physical image; and generating a 2D representation of the object, based on the captured digital copy of the physical image, at a location within the 2D editing frame corresponding to the 2D position of the object within the captured digital copy of the physical image.

12. A system for building a digital three-dimensional (3D) environment, the system comprising:

input/output (I/O) circuitry; and control circuitry configured to:

generate for display a first two-dimensional (2D) editing frame;

receive, using the I/O circuitry, a first input comprising an indication of an object to be incorporated into the editing frame, wherein the first input specifies 2D position information for the object and a description of the object;

generate a 2D representation of the object, based on the description of the object, at a location within the 2D editing frame corresponding to the 2D position information for the object;

calculate, based on the 2D position information, 3D position information of the object;

generate for display a 3D representation of the object at a location within the digital 3D environment corresponding to the 3D position information of the object;

receiving, using the I/O circuitry, a second input to edit a current view of the digital 3D environment;

generate for display a second 2D editing frame, wherein the second 2D editing frame comprises a 2D representation of a 3D object in the current view of the digital 3D environment;

receive, using the I/O circuitry, a third input to modify at least one object in the second 2D editing frame; and in response to the third input, update the 2D editing frame and the digital 3D environment.

13. The system of claim 12, wherein the first input further specifies relative depth information for the object with respect to at least one other object in the 2D editing frame.

14. The system of claim 12, wherein the object is a first object and wherein the first input further comprises 2D position information and a description of a second object to be incorporated into the 2D editing frame, and wherein the control circuitry is further configured to:

determine, using a segmentation engine, a relative depth of each object of the plurality of objects; and calculate a respective 3D position for each of the first object and the second object based on the 2D position information of each respective object and the relative depth of each respective object.

15. The system of claim 12, wherein the digital 3D environment is a video game environment.

16. The system of claim 12, wherein the control circuitry is further configured to:

identify a plurality of objects in the 2D editing frame;

determine, for each respective object of the plurality of objects, an object type;

assign a first subset of one or more objects of the plurality of objects of a first type to a first layer; and assign a second subset of one or more objects of the plurality of objects of a second type to a second layer.

17. The system of claim 16, wherein the control circuitry is further configured to:

receive, using the I/O circuitry, a fourth input to edit one or more objects of the first object type in the digital 3D environment; and generate for display a third 2D editing frame based on a current view of the digital 3D environment being displayed, wherein the third 2D editing frame comprises 2D representations of objects assigned to the first layer.

18. The system of claim 12, wherein the control circuitry is further configured to:

receive, using the I/O circuitry, a fourth input to edit a 3D representation of an object; and in response to the fourth input, update, substantially simultaneously, the digital 3D environment and the 2D editing frame.

19. The system of claim 12, wherein the control circuitry is further configured to:

generate, based on the first input, metadata describing the object; and store the metadata in association with the object.

20. The system of claim 19, wherein the control circuitry is further configured to:

in response to receiving, using the I/O circuitry, the third input, retrieve the metadata stored in association with the object to be modified; and generate for display at least one metadata item from the retrieved metadata.

* * * * *